(12) United States Patent
He et al.

(10) Patent No.: US 11,161,235 B2
(45) Date of Patent: Nov. 2, 2021

(54) SELF-MOVING ROBOT

(71) Applicant: Positec Technology (China) Co., Ltd, Suzhou (CN)

(72) Inventors: Mingming He, Suzhou (CN); Zhendong Gao, Suzhou (CN); Ka Tat Kelvin Wong, Suzhou (CN); Gen Sun, Suzhou (CN); Qiang Liu, Suzhou (CN); Yue Rao, Suzhou (CN)

(73) Assignee: POSITEC TECHNOLOGY (CHINA) CO., LTD., Suzhou (CN)

( * ) Notice: Subject to any disclaimer, the term of this patent is extended or adjusted under 35 U.S.C. 154(b) by 196 days.

(21) Appl. No.: 16/459,237

(22) Filed: Jul. 1, 2019

(65) Prior Publication Data

US 2019/0321964 A1 Oct. 24, 2019

Related U.S. Application Data

(63) Continuation of application No. 15/528,261, filed on May 19, 2017, now Pat. No. 10,377,035.

(Continued)

(30) Foreign Application Priority Data

Nov. 19, 2014 (CN) .......................... 201410663077.7
Jul. 30, 2015 (CN) .......................... 201510459244.0

(51) Int. Cl.
*B25J 5/00* (2006.01)
*A01D 34/00* (2006.01)
(Continued)

(52) U.S. Cl.
CPC .............. *B25J 5/00* (2013.01); *A01D 34/008* (2013.01); *A01G 25/09* (2013.01); *B25J 9/08* (2013.01); *B25J 19/005* (2013.01)

(58) Field of Classification Search
CPC ... B25J 5/00; B25J 9/08; B25J 19/005; A01D 34/008; A01G 25/09
See application file for complete search history.

(56) References Cited

U.S. PATENT DOCUMENTS

| | | |
|---|---|---|
| 3,882,615 A | 5/1975 | Williams |
| 5,163,273 A | 11/1992 | Wojtkowski et al. |
| | (Continued) | |

FOREIGN PATENT DOCUMENTS

| | | |
|---|---|---|
| AU | 199731050 | 1/1998 |
| AU | 2006304812 | 4/2007 |
| | (Continued) | |

OTHER PUBLICATIONS

U.S. Appl. No. 15/528,261, Notice of Allowance, dated Apr. 3, 2019, 10 pages.

(Continued)

*Primary Examiner* — Calvin Cheung
(74) *Attorney, Agent, or Firm* — Stoel Rives LLP

(57) ABSTRACT

A self-moving robot includes a shell, a driving module, driving the self-moving robot to move on the ground; a mowing module, executing mowing work; an energy module, providing energy for the self-moving robot; a control module, controlling the self-moving robot to automatically move and execute work, the self-moving robot further includes a cleaning module executing ground cleaning work; the self-moving robot has a mowing mode and a cleaning mode, under the mowing mode, the control module controls the self-moving robot to execute mowing work, and under the cleaning mode, the control module controls the self-moving robot to execute cleaning work.

11 Claims, 16 Drawing Sheets

Related U.S. Application Data

(60) Provisional application No. PCT/CN2015/094050, filed on Nov. 6, 2015.

(51) Int. Cl.
  *A01G 25/09* (2006.01)
  *B25J 9/08* (2006.01)
  *B25J 19/00* (2006.01)

(56) References Cited

U.S. PATENT DOCUMENTS

| | | | |
|---|---|---|---|
| 5,204,814 A | 4/1993 | Noonan et al. | |
| 5,444,965 A * | 8/1995 | Colens | A01D 69/02 56/10.2 A |
| 5,573,078 A | 11/1996 | Stringer et al. | |
| 5,921,338 A | 7/1999 | Edmondson | |
| 5,992,134 A | 11/1999 | Blide et al. | |
| 6,321,515 B1 | 11/2001 | Colens | |
| 6,338,013 B1 | 1/2002 | Ruffner | |
| 7,430,782 B2 | 10/2008 | Ruffo | |
| 7,827,653 B1 | 11/2010 | Liu et al. | |
| 8,342,271 B2 | 1/2013 | Filippov et al. | |
| 8,386,090 B1 | 2/2013 | Hobbs, Jr. et al. | |
| 9,829,891 B2 * | 11/2017 | Smith | G01B 11/14 |
| 2002/0156556 A1 | 10/2002 | Ruffner | |
| 2003/0029149 A1 | 2/2003 | Fillman et al. | |
| 2004/0093650 A1 | 5/2004 | Martins et al. | |
| 2005/0055142 A1 * | 3/2005 | McMurtry | A63C 19/00 701/31.4 |
| 2008/0039974 A1 * | 2/2008 | Sandin | B60L 50/52 700/258 |
| 2009/0281661 A1 | 11/2009 | Dooley et al. | |
| 2011/0043515 A1 | 2/2011 | Stathis | |
| 2012/0189507 A1 | 7/2012 | Ko | |
| 2012/0215348 A1 | 8/2012 | Skrinde | |
| 2012/0256752 A1 | 10/2012 | Musser et al. | |
| 2012/0265343 A1 | 10/2012 | Gilbert, Jr. et al. | |
| 2012/0265370 A1 | 10/2012 | Kim et al. | |
| 2012/0265391 A1 * | 10/2012 | Letsky | G05D 1/0088 701/25 |
| 2012/0290164 A1 | 11/2012 | Hanson et al. | |
| 2013/0047570 A1 * | 2/2013 | Takahashi | B60L 50/16 56/203 |
| 2013/0076304 A1 | 3/2013 | Andersson et al. | |
| 2013/0125778 A1 | 5/2013 | Lacabe | |
| 2014/0058611 A1 * | 2/2014 | Borinato | A01D 34/008 701/23 |
| 2014/0121881 A1 | 5/2014 | Diazdelcastillo | |
| 2014/0137528 A1 | 5/2014 | Schygge et al. | |
| 2014/0375272 A1 | 12/2014 | Johnsen et al. | |
| 2018/0199506 A1 | 7/2018 | Ito et al. | |

FOREIGN PATENT DOCUMENTS

| | | |
|---|---|---|
| AU | 2011372805 | 1/2013 |
| CN | 1198654 | 11/1998 |
| CN | 1927553 | 3/2007 |
| CN | 101100058 | 1/2008 |
| CN | 201932015 | 8/2011 |
| CN | 103054517 | 4/2013 |
| CN | 203261744 | 11/2013 |
| CN | 103430707 | 12/2013 |
| CN | 103813918 | 5/2014 |
| CN | 104111651 | 10/2014 |
| EP | 920367 | 6/1999 |
| EP | 965261 | 12/1999 |
| EP | 1487252 | 12/2004 |
| EP | 1745686 | 1/2007 |
| EP | 1759965 A1 | 3/2007 |
| EP | 2279880 | 2/2011 |
| EP | 2656718 | 10/2013 |
| EP | 2659825 | 11/2013 |
| EP | 2731815 | 5/2014 |
| GB | 2487529 | 8/2012 |
| IL | 118711 | 2/2004 |
| WO | 9706664 | 2/1997 |
| WO | 9749528 | 12/1997 |
| WO | 1997049528 | 12/1997 |
| WO | 9938056 | 7/1999 |
| WO | 2000060921 | 10/2000 |
| WO | 2005006098 | 1/2005 |
| WO | 2005074362 | 8/2005 |
| WO | 2007028049 | 3/2007 |
| WO | 2008105948 | 9/2008 |
| WO | 2011145989 | 11/2011 |
| WO | 2013009322 | 1/2013 |
| WO | 2013100833 | 7/2013 |
| WO | 2014007729 | 1/2014 |

OTHER PUBLICATIONS

U.S. Appl. No. 15/528,261, Non-Final Office Action, dated Oct. 25, 2018.

20163341.9, Extended European Search Report, dated Aug. 13, 2020, 7 pages.

* cited by examiner

SELF-MOVING ROBOT

RELATED APPLICATIONS

This application claims priority to U.S. patent application Ser. No. 15/528,261 which is incorporated by reference in its entirety.

BACKGROUND

Technical Field

The present invention relates to a self-moving robot. The present invention particularly relates to a modularized self-moving robot.

Related Art

Automated household devices, for example, automatic dust collectors, have an automatic working program, and can work automatically without manual operation and control from beginning to end. In virtue of these automated household devices, people can be liberated from tedious and time-consuming household tasks and obtain more leisure time. Such automated household devices are also called as automatic working devices, automated robots, etc. Specific to various requirements of household users, various specialized automatic robots, such as automatic dust collectors, automatic security and protection robots, automatic mowers, automatic irrigators, etc., are emerged in larger numbers at present. The problem emerged therewith is that the user needs to purchase different automatic devices for meeting different demands, for example, the user may dispose the automatic dust collector and security and protection robot indoors simultaneously, and dispose the automatic mower, the automatic irrigator, an automatic blower outdoors simultaneously, etc. As a result, firstly high expense is caused, and secondly, a household environment is disordered. Usually, a charging station and related wires are required to be singly disposed for every kind of automatic device, for outdoor machines, different border signal lines are also required to be disposed for different systems, and these border signal lines may generate mutual interference.

In hot summer, water content in the lawn will be fast evaporated, as a result, the soil is dried, vegetation is lack of water, for which the autonomous mower is also helpless, and the user needs to spend time and labor to water and is suffered unspeakably; for another example, the user needs to apply a liquid fertilizer to the lawn in person. Therefore, in addition to the automatic mowing function, other functions are also available, such that the autonomous mower which can further reduce the labor intensity of the user is very expected.

Therefore, some manufacturers attempt to design and manufacture an automatic working device integrating multiple functions, and different working modules required for finishing different pieces of work are integrated into one machine body. However, the integrated automatic working device also has lots of defects. At first, the machine is difficult to design and manufacture, a fault rate is high, and a maintenance cost in later stage is larger; secondly, a machine cost is high, a price is high and product popularization is affected; thirdly, the machine size is huge, the weight is heavy, increased energy consumption is caused, working time after charging one time is short, and working efficiency is affected. Fourthly, the user may need to pay the bill for some functions which are not required actually.

SUMMARY

In view of this, an objective of the present invention is to provide a self-moving robot integrating multiple functions in a whole.

A technical solution adopted by the present invention to solve the existing technical problem is: the embodiment of the present invention provides:

A self-moving robot comprises a shell, a driving module, driving the self-moving robot to move on the ground; a mowing module, executing mowing work; an energy module, providing energy for the self-moving robot; a control module, controlling the self-moving robot to automatically move and execute work, wherein the self-moving robot further comprises a cleaning module executing ground cleaning work; the self-moving robot has a mowing mode and a cleaning mode, under the mowing mode, the control module controls the self-moving robot to execute mowing work, and under the cleaning mode, the control module controls the self-moving robot to execute cleaning work.

In one embodiment, the self-moving robot also comprises a ground recognizing unit, which collects ground information of a target area and judges the target ground to be a grassland or road surface.

In one embodiment, the control module, according to a recognized result of the ground recognizing unit on the target area, controls the self-moving robot to be kept on the grassland under the mowing mode to execute mowing work and to be kept on the road surface under the cleaning mode to execute cleaning work.

In one embodiment, the control module, according to a recognized result of the ground recognizing unit on the target area, is switched to the cleaning mode from the mowing mode when the self-moving robot moves to the road surface from the grassland; and is switched to the mowing mode from the cleaning mode when the self-moving robot moves to the grassland from the road surface.

In one embodiment, the control module, according to a recognized result of the ground recognizing unit on the target area, controls the self-moving robot to be in the mowing mode when it is on the grassland, and controls the self-moving robot to be in the cleaning mode when it is on the road surface.

In one embodiment, the ground recognizing unit comprises a camera and a recognizing element connected to the camera; the camera captures a ground image of the target area and transmits to the recognizing unit, a ground type judging algorithm is preset in the recognizing element, and the recognizing element extracts image features and transmits to the ground type judging algorithm to judge the target area to be the grassland or road surface.

In one embodiment, the ground recognizing unit comprises a ground hardness sensor and a recognizing element connected to the ground hardness sensor; the ground hardness sensor collects the ground hardness information of the target area and transmits the recognizing element, a ground type judging algorithm is preset in the recognizing element, and the recognizing element inputs the ground hardness information to the ground type judging algorithm to judge the target area to be the grassland or road surface.

In one embodiment, the control module comprises a mode control unit, which controls the self-moving robot to be switched between the mowing mode and the cleaning mode according to a preset program.

In one embodiment, the mode control unit allocates time when the self-moving robot is in the mowing mode and time when the self-moving robot is in the cleaning mode according to date or season information.

In one embodiment, the cleaning module is a leaf cleaning module configured to clean leaves.

In one embodiment, the leaf cleaning module is a blowing module, an air sucking module or sweeping module.

In one embodiment, the cleaning module is detachably mounted on the shell.

Compared with the prior art, the embodiment of the present invention has the beneficial effects: the self-moving robot has the mowing module which can realize an automatic mowing function and also has the cleaning module which can realize an automatic ground cleaning function. The user can use one machine for multiple purposes, and cost is reduced. The self-moving robot judges whether the target area is the grassland or the road surface by the ground type recognizing unit, so as to automatically switch the mowing working mode or the cleaning mode, and use efficiency of the machine is improved.

Another objective of the present invention is to provide a self-moving robot system which is low in cost and have many functions.

A technical solution adopted by the present invention to solve the existing technical problem is: the embodiment of the present invention provides a self-moving robot, comprising a self-moving module and at least one of a plurality of interchangeable working modules connected to the self-moving module, wherein the self-moving robot comprises a control unit, a first energy unit, a first walking unit and a first interface unit, and the control unit executes a predetermined command to control the self-moving robot to operate; the first energy unit comprises a chargeable battery, providing energy for the self-moving module or the self-moving robot; the first walking unit assists the self-moving module in walking; the working module comprises a first working unit, a second walking unit and a second interface unit, the first working unit executes a specific type of work, and the second walking unit assists the working module in walking; the first interface unit and the second interface unit can be correspondingly matched and connected to connect the working module onto the self-moving module, the self-moving robot is characterized in that the working module further comprises a second energy unit, the first energy unit comprises a chargeable battery, and the second energy unit provides energy for the working module or the self-moving robot.

In one embodiment, the self-moving module further comprises a second working unit, executing a specific type of work.

In one embodiment, the working module is provided with a charging interface, and the charging interface can be connected to an external power source interface to receive charged electric energy.

In one embodiment, the charging interface and the power source interface are both wireless charging interfaces.

In one embodiment, the first interface unit comprises a first energy interface, a first control interface and a first mechanical interface; the second interface unit comprises a second energy interface, a second control interface and a second mechanical interface, when the first interface unit and the second interface unit are matched and connected, the first energy interface and the second energy interface are jointed to transmit energy between the self-moving module and the working module, the first control interface and the second control interface are jointed to transmit signals between the self-moving module and the working module and the first mechanical interface and the second mechanical interface are jointed to connect the self-moving module and the working module together.

In one embodiment, the self-moving module comprises a charging interface, and the working module is connected to an external power source interface through the second energy interface, the first energy interface and the charging interface to receive charged electric energy.

In one embodiment, the charging interface comprises a first charging contact group and a second charging contact group, the first charging contact group is connected to the first energy unit to charge the same, and the second charging contact group is connected to the second energy unit through the first energy interface and the second energy interface to charge the second energy unit.

In one embodiment, the self-moving module further comprises a detecting unit, the detecting unit detects the working module and sends a detected result to the control unit; the control unit judges whether the working module required to be connected is detected according to the detected result, and when the judged result is yes, the control unit controls a first walking unit to walk, such that the self-moving module is connected to the working module required to be connected.

In one embodiment, the working module is at least one of a mower module, a sweeper module, a snow sweeper module, a blowing-sucking machine module, a fertilizer module and a sprinkler module.

In one embodiment, the control unit monitors an energy level of the first energy unit and the second energy unit, and controls the second energy unit to provide energy for the working module when the energy level of the second energy unit is larger than a first threshold; and controls the first energy unit to provide energy for the working module when the energy level of the second energy unit is smaller than the first threshold and the energy level of the first energy unit is larger than a second threshold.

In one embodiment, the self-moving module also comprises a detecting unit, the detecting unit detects a working module and sends a detected result to the control unit; the control unit judges whether the working module required to be connected is detected according to the detected result, and when the judged result is yes, the control unit controls a first walking unit to walk, such that the self-moving module is connected to the working module required to be connected.

In one embodiment, the working module or a parking location of the working module is provided with a working module identifier corresponding to the working module, and the detecting module detects the working module by detecting the working module identifier.

In one embodiment, the working module identifier is an RFID label and the detecting module is an RFID reader.

In one embodiment, the working module identifier is an image label, and the detecting module is an image capturing device.

In one embodiment, the image identifier is a bar code or two-dimensional code.

In one embodiment, the self-moving robot also comprises a guiding unit, the guiding unit outwards extends from the parking location of the working module, the self-moving module also comprises a guidance sensing unit, the guidance detecting unit detects a location of the guiding unit and sends a detected result to the control unit, and the control unit walks along the guiding unit according to the received detected result to approach to the working module.

In one embodiment, the guiding unit is an electric signal wire or metal guide rail; and the guidance detecting unit corresponds to an electric signal sensing unit or a metal sensing unit.

In one embodiment, a first interface unit comprises a first energy interface, a first control interface and a first mechanical interface; a second interface unit comprises a second energy interface, a second control interface and a second mechanical interface, when the first interface unit and the second interface unit are matched and connected, the first energy interface and the second energy interface are jointed to transmit energy between the self-moving module and the working module, the first control interface and the second control interface are jointed to transmit signals between the self-moving module and the working module and the first mechanical interface and the second mechanical interface are jointed to connect the self-moving module and the working module together.

In one embodiment, the control module optionally controls the first mechanical interface and the second mechanical interface to establish or remove the connection.

In one embodiment, one of the first mechanical interface and the second mechanical interface is provided with an electromagnet and the other one is provided with a material capable of attracting the electromagnet, and the control module optionally controls the first mechanical interface and the second mechanical interface to establish or remove connection by controlling a polarity of the electromagnet.

Compared with the prior art, the embodiment of the present invention has the beneficial effects: the self-moving robot can execute various types of working tasks in a working area in an unattended manner by disposing the self-moving module and the interchangeable working modules, and by disposing the single energy unit for the working module, the working module is sufficient in energy and long in duration.

The embodiment of the present invention further provides a self-moving robot, comprising a self-moving module and at least one of a plurality of interchangeable working modules connected to the self-moving module, wherein the self-moving module comprises a control unit, a first energy unit, a first walking unit and a first interface unit, and the control unit executes a predetermined command to control the self-moving robot to operate; the walking unit assists the self-moving module in walking; the working module comprises a first working unit, a second walking unit and a second interface unit, the first working unit executes a specific type of work, and the second walking unit assists the working module in walking; the first interface unit and the second interface unit can be correspondingly matched and connected to connect the working module onto the self-moving module, and the self-moving module further comprises a detecting unit, which detects the working module and sends a detected result to the control unit; the control unit judges whether the working module required to be connected is detected according to the detected result, and when the judged result is yes, the control unit controls the first walking unit to walk such that the self-moving module is connected to the working module required to be connected.

In one embodiment, the working module or a parking location of the working module is provided with a working module identifier corresponding to the working module, and the detecting module detects the working module by detecting the working module identifier.

In one embodiment, the working module identifier is an RFID label and the detecting module is an RFID reader.

In one embodiment, the working module identifier is an image label, and the detecting module is an image capturing device.

In one embodiment, the image identifier is a bar code or two-dimensional code.

In one embodiment, the self-moving robot also comprises a guiding unit, the guiding unit outwards extends from the parking location of the working module, the self-moving module also comprises a guidance sensing unit, the guidance detecting unit detects a location of the guiding unit and sends a detected result to the control unit, and the control unit walks along the guiding unit according to the received detected result to approach to the working module.

In one embodiment, the guiding unit is an electric signal wire or metal guide rail; and the guidance detecting unit corresponds to an electric signal sensing unit or a metal sensing unit.

In one embodiment, a first interface unit comprises a first energy interface, a first control interface and a first mechanical interface; a second interface unit comprises a second energy interface, a second control interface and a second mechanical interface, when the first interface unit and the second interface unit are matched and connected, the first energy interface and the second energy interface are jointed to transmit energy between the self-moving module and the working module, the first control interface and the second control interface are jointed to transmit a signal between the self-moving module and the working module and the first mechanical interface and the second mechanical interface are jointed to connect the self-moving module and the working module together.

In one embodiment, the control module optionally controls the first mechanical interface and the second mechanical interface to establish or remove the connection.

In one embodiment, one of the first mechanical interface and the second mechanical interface is provided with an electromagnet and the other one is provided with a material capable of attracting the electromagnet, and the control module optionally controls the first mechanical interface and the second mechanical interface to establish or remove connection by controlling a polarity of the electromagnet.

In one embodiment, the working module further comprises a second energy unit, the first energy unit comprises a chargeable battery, and the second energy unit provides energy for the working module or the self-moving robot.

In one embodiment, the self-moving module further comprises a second working unit, executing a specific type of work.

In one embodiment, the working module is provided with a charging interface, which can be connected to an external power source interface to receive charged electric energy.

In one embodiment, the charging interface and the power source interface are both wireless charging interfaces.

In one embodiment, the self-moving module comprises a charging interface, and the working module is connected to the external power source interface through the second energy interface, the first energy interface and the charging interface to receive charged electric energy.

In one embodiment, the charging interface comprises a first charging contact group and a second charging contact group, the first charging contact group is connected to the first energy unit to charge the same, and the second charging contact group is connected to the second energy unit through the first energy interface and the second energy interface to charge the second energy unit.

In one embodiment, the self-moving module further comprises a detecting unit, the detecting unit detects the working module and sends a detected result to the control unit; the control unit judges whether the working module required to be connected is detected according to the detected result, and when the judged result is yes, the control unit controls a first walking unit to walk, such that the self-moving module is connected to the working module required to be connected.

In one embodiment, the working module is at least one of a mower module, a sweeper module, a snow sweeper module, a blowing-sucking machine module, a fertilizer module and a sprinkler module.

In one embodiment, the control unit monitors an energy level of the first energy unit and the second energy unit, and controls the second energy unit to provide energy for the working module when the energy level of the second energy unit is larger than a first threshold; and controls the first energy unit to provide energy for the working module when the energy level of the second energy unit is smaller than the first threshold and the energy level of the first energy unit is larger than a second threshold.

Compared with the prior art, the embodiment of the present invention has the beneficial effects: the self-moving robot executes various types of working tasks in the working area in an unattended manner by disposing the self-moving module, the interchangeable working modules and automatically seeking for the required working module, and the machine has multiple functions, is high in flexibility and simple in operation.

In order to overcome defects of the prior art, the embodiment of the present invention aims to provide an autonomous mower system which has an automatic liquid sprinkling function in addition to an automatic mowing function, and enables the user to be liberated from the work of lawn maintenance.

In order to solve the problem above, a technical solution of the embodiment of the present invention is: an autonomous mower system, comprising a dock and an autonomous mower configured to automatically walk and mow on the ground, the autonomous mower comprises a shell, a containing cavity being formed in the shell and the shell comprising a shell bottom and an opposite shell top; a walking motor mounted in the containing cavity; a cutting motor mounted in the containing cavity; a wheel set mounted on the shell bottom and driven by the walking motor to drive the autonomous mower walk; a cutting part mounted on the shell bottom and driven by the current motor to execute cutting work; an energy unit providing energy for the autonomous mower; a controller mounted in the containing cavity and controlling the autonomous mower to automatically walk and mow; and a liquid sprinkling device controlled by the controller to execute sprinkling work.

In one embodiment, the liquid sprinkling device comprises a liquid box mounted in the containing cavity for containing liquid and a pipeline communicated with the liquid box, the pipeline extends out of the shell from the containing cavity, and the controller is configured to control the liquid in the liquid box to enter into and exit from the pipeline.

In one embodiment, the autonomous mower comprises a liquid level monitoring module, which is configured to monitor a liquid content in the liquid box, and the controller judges whether liquid is required to be replenished to the liquid box according to the liquid content.

In one embodiment, the dock is connected to a liquid supplying pipe configured to replenish the liquid to the liquid box.

In one embodiment, the pipeline comprises a first pipeline for liquid feeding and a second pipeline for liquid sprinkling, and the liquid supplying pipe is jointed with the first pipeline.

In one embodiment, the first pipeline extends out behind the shell, and the second pipeline extends out above the shell.

In one embodiment, the autonomous mower further comprises a liquid pump mounted in the containing cavity, and the liquid pump is controlled by the controller to discharge the liquid in the liquid box from the pipeline optionally.

In one embodiment, the autonomous mower comprises an image capturing module, which shoots a front area of the autonomous mower and generates a picture corresponding to the front area; and the controller analyzes the picture to determine a location and path of the autonomous mower.

In one embodiment, the autonomous mower comprises a locating device, recording walking coordinates when the autonomous mower executes sprinkling work, the controller analyzes the coordinates and judges whether liquid has been sprinkled at the coordinates, and if no, the controller controls the autonomous mower to perform the sprinkling work.

The autonomous mower according to the embodiment of the present invention integrates the automatic mowing and liquid sprinkling functions, functions of the autonomous mower are expanded and people's lives are simplified.

The technical problem to be solved by the embodiment of the present invention is to provide an autonomous mower which has an automatic liquid sprinkling function expect for an automatic mowing function, and enables the user to be liberated from the work of lawn maintenance.

In order to solve the problem above, a technical solution of the embodiment of the present invention is: an autonomous mower configured to automatically walk and mow on the ground, the autonomous mower comprises a shell, a containing cavity being formed in the shell and the shell comprising a shell bottom and an opposite shell top; a walking motor mounted in the containing cavity; a cutting motor mounted in the containing cavity; a wheel set mounted on the shell bottom and driven by the walking motor to drive the autonomous mower walk; a cutting part mounted on the shell bottom and driven by the current motor to execute cutting work; an energy unit providing energy for the autonomous mower; a controller mounted in the containing cavity and controlling the autonomous mower to automatically walk and mow; and a liquid sprinkling device controlled by the controller to execute sprinkling work.

Compared with the prior art, the autonomous mower of the embodiment of the present invention is provided with the liquid sprinkling device in the containing cavity in addition to basic functions of automatic walking and mowing, automatic returning for charging, etc., in this process, the autonomous mower can finish the liquid sprinkling work spontaneously without direct manual control and operation, manual operation is greatly reduced, time and labor are saved, such that the user can be liberated from the work of lawn maintenance completely.

BRIEF DESCRIPTION OF THE DRAWINGS

The objectives, technical solutions and beneficial effects of the embodiment of the present invention can be described in detail through the following specific embodiments capable of implementing the present invention.

The same signs and symbols in the drawings and description are used for representing the same or equivalent elements.

| | | |
|---|---|---|
| 1, self-moving module | 3, working module | 5, dock |
| 7, working area | 11, control unit | 13, first energy unit |
| 15, first walking unit | 17, first interface unit | 19, second working unit |
| 21, detecting unit | 211, RFID reader | 213, image capturing device |
| 171, first energy interface | 173, first control interface | 175, first mechanical interface |
| 33, second energy unit | 35, second walking unit | 37, second interface unit |
| 39, first working unit | 371, second energy unit | 373, second control interface |
| 375, second mechanical interface | 43, guiding unit | 411, RFID label |
| 413, image identifier | 51, connecting end | 71, matching-connecting end |
| 53, containing hole | 55, electromagnet | 57, sliding bush |
| 58, clamping ball | 59, spring | 61, fastener |
| 63, elastic member | 73, bolt | 75, permanent magnet |
| 571, containing slot | 731, clamping groove | 611, pivoting shaft |
| 613, first rotary arm | 615, second rotary arm | 617, third rotary arm |
| 733, bayonet | 618, clamping hook | 12, side wing |
| 101, self-moving robot | 103, working area | 131, grassland |
| 133, road surface | 111, control module | 113, energy module |
| 115, driving module | 117, mowing module | 119, cleaning module |
| 121, ground recognizing unit | 191, fan | 193, air duct |
| 201, autonomous mower system; | 202, ground; | 204, dock; |
| 210, autonomous mower; | 212, shell | 2121, shell top |
| 2122, shell bottom | 214, controller; | 216, liquid sprinkling device; |
| 2161, liquid box | 2163, first pipeline | 2165, second pipeline |
| 218, working module; | 220, walking module; | 2201, wheel set |
| 222, energy module; | 224, liquid level monitoring module | 226, liquid supplying pipe |
| 228, liquid pump | 230, image capturing device | |

DETAILED DESCRIPTION

Figure 1:
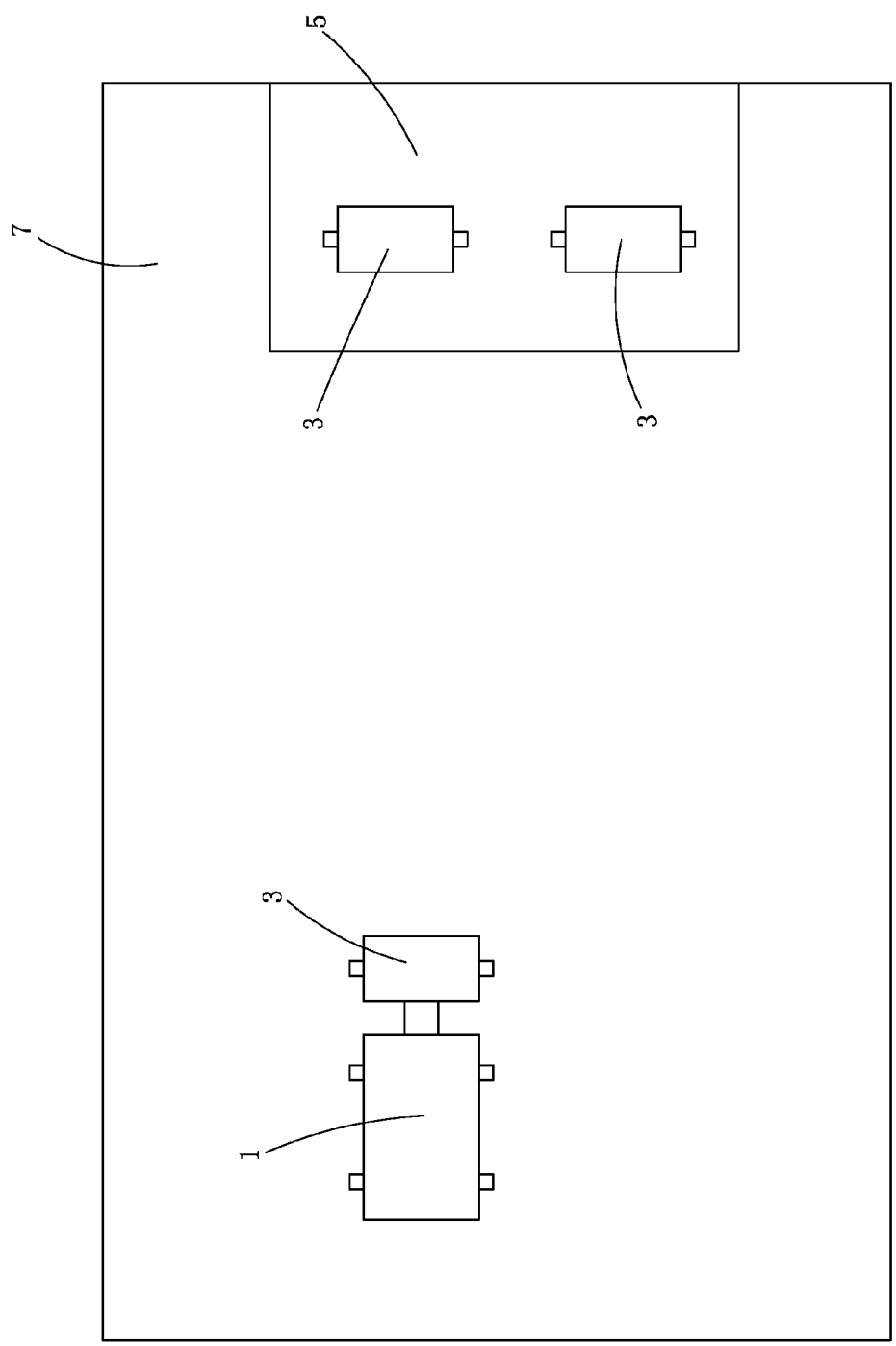
FIG. 1 is a schematic diagram of a self-moving robot system of one embodiment of the present invention.

As shown in FIG. 1, in a first embodiment of the present invention, a self-moving robot system comprises a self-moving robot and a dock 5. The self-moving robot comprises a self-moving module and at least one of a plurality of interchangeable working modules 3 connected to the self-moving module 1. The self-moving robot automatically cruises in a working area 7 and executes work, and the dock 5 allows the self-moving robot to park.

Reference is continuously made to FIG. 1, the dock 5 allows the self-moving robot to park when not in work, and the dock 5 is provided with a parking location of the working module 3, which is configured to park a plurality of working modules 3. The self-moving robot can unload, connect or replace the working module 3 at the dock 5. In one embodiment, the dock 5 is provided with a power source interface, which charges the self-moving robot.

Figure 2:
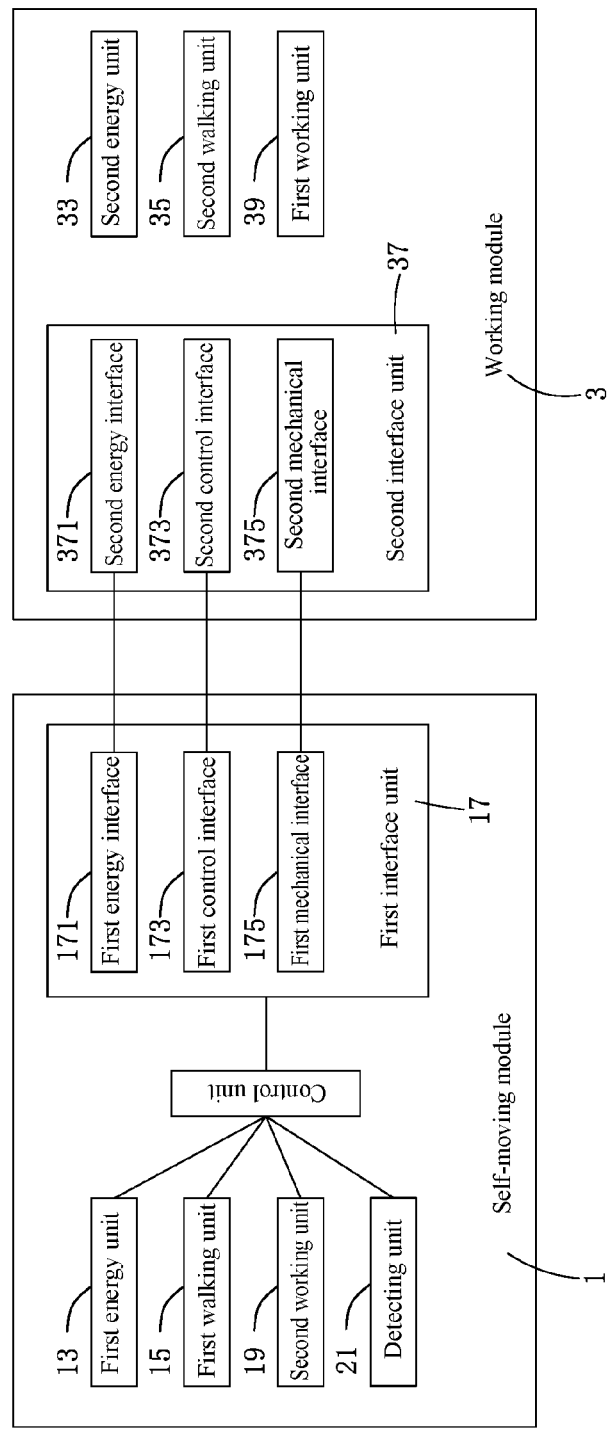
FIG. 2 is a module diagram of a self-moving robot of one embodiment of the present invention.

As shown in FIG. 2, the self-moving module 1 comprises a control unit 11, a first energy unit 13, a first walking unit 15 and a first interface unit 17 and also comprises a shell for mounting the respective units above. A specific physical form of the control unit 11 is configured as a control circuit board where one or more processors, storages, other relates elements and corresponding peripheral circuits are disposed. A control program is disposed in the control unit to execute a predetermined command, and the self-moving robot is controlled to operate and cruise and work in the working area 7, and to return to the dock 5 for replenishing energy and connect the required working module 3. The first energy unit 13 comprises a chargeable battery pack, and the first energy unit 13 provides energy for the self-moving module 1 or the self-moving robot. The first walking unit 15 comprises a walking motor and a walking part, and the walking motor drives the walking part to move relative to the ground, so as to drive the self-moving module 1 or the self-moving robot to walk relative to the ground. One or more walking motors are disposed, and the walking part is a structure well known in the industry such as a wheel set or a track, and is not repeated specifically.

In one embodiment, the self-moving module 1 comprises a second working unit 19, configured to execute a specific type of work, for example, mowing. In one embodiment, the self-moving module does not have the second working unit 19.

There are many different types of working modules 3, and the specific type of working module 3 executes the specific type of work. For example, if the type of the working module 3 is a mowing module, then the working module 3 executes mowing work; if the type of the working module 3 is a snow sweeping module, then the working module 3 executes snow sweeping work; if the type of the working module 3 is a leaf collecting module, then the working module 3 executes a smashed leaf collecting; and if the type of the working module 3 is a blowing module, then the working module 3 executes blowing work, and so on, and no examples are further made. Various types of working modules are interchangeably connected to the self-moving module 1 above.

The working module 3 comprises a first working unit 39, a second walking unit 35 and a second interface unit 37, and further comprises a shell for mounting the respective units. The first working unit 39 executes the specific working task above, its specific structure is different according to different types of working modules 3, that is, different according to different kinds of working tasks. For example, the first working unit 39 of the mowing module is a mowing working head, which at least comprises a mowing blade; the first working unit 39 of the snow sweeping module is a snow sweeping working head; the first working unit 39 of the leaf collecting module is a leaf collecting unit, which at least comprises a sucking component for sucking smashed leaves and a leaf collecting bin for storing the smashed leaves, and the sucking component comprises a sucking pipe and rotatable blades forming a negative pressure at the opening of the sucking pipe; and the first working unit 39 of the blowing module is a blowing unit, which at least comprises a blowing component, specifically comprising a blowing pipe and blades forming an outward airflow at the opening of the blowing pipe, etc. In one embodiment, the first working unit 39 of the working module 3 comprises a working motor to output power required by work; and in another optional embodiment, the first working unit 39 shares a motor with the working module 3 or other units of the self-moving module 1 instead of comprising the working motor.

The second walking unit 35 comprises a walking part, driven to move relative to the ground, such that the self-moving module or the self-moving robot is driven to walk relative to the ground. The walking part is a structure well known in the industry such as a wheel set or a track, and is not repeated specifically. In the optional embodiment, the second walking unit 35 also comprises a walking motor, driving the walking part to move. In other optional embodiments, the second walking unit 35 does not comprise a walking motor, and the walking parts are merely driven parts such as driven wheels, etc., which are driven by the self-moving module 3 to assist the working module 3 in moving.

In one embodiment, the working module 3 comprises a second energy unit 33, comprising a chargeable battery pack, and the second energy unit 33 provides energy for the working module 3 or the self-moving robot. In the present embodiment, the control unit 11 monitors an energy level of the first energy unit 13 and the second energy unit 33, controls the second energy unit 33 to provide energy for the working module 3 when the energy level of the second energy unit 13 is larger than a first threshold; and controls the first energy unit 13 to provide energy for the working module 3 when the energy level of the second energy unit 33 is smaller than the first threshold and the energy level of the first energy unit 13 is larger than a second threshold. In other optional embodiments, the working module 3 may not comprise the second energy unit 33, and the energy required for the working module 3 to work comes from the self-moving module 1.

Reference is continuously made to FIG. 2, the first interface unit 17 of the self-moving module 1 and the second interface unit 37 of the working module 3 can be correspondingly matched and connected to connect the working module 3 onto the self-moving module 1. The first interface unit 17 comprises a first mechanical interface 175, a first control interface 173 and a first energy interface 171; the second interface unit 37 is correspondingly provided with a second mechanical interface 375, a second control interface 373 and a second energy interface 371. When the first interface unit 17 and the second interface unit 37 are connected, the first mechanical interface 175 and the second mechanical interface 375 are connected, the first energy interface 171 and the second energy interface 371 are connected, and the first control interface 173 and the second control interface 373 are connected. The first mechanical interface 175 and the second mechanical interface 375 are connected to optionally interlock the self-moving module 1 and the working module 3 together to move together. The first control interface 173 and the second control interface 373 are connected to realize signal transmission between the self-moving module and the working module, such that the self-moving module 1 can control the working module 3 to work by the first control interface 173 and the second control interface 373, and the working module 3 can feed various operation parameters and environmental information to the self-moving module 1. The first energy interface 171 and the second energy interface 371 are connected to realize energy transmission between the self-moving module 1 and the working module 3, for example, the self-moving module 1 transmits energy to the working module 3, or in turn, the working module 3 transmits energy to the self-moving module 1.

In one optional embodiment, the working module 3 is connected to an external power source interface through the self-moving module 1 to receive charged energy. That is, the charging interface of the self-moving module 1 is connected to the power source interface to receive the charged electric energy, then at least part of charged electric energy is transmitted to the second energy unit 33 of the working module 3 through the first energy interface 171 and the second energy interface 371. In one design solution of the embodiment, the charging interface of the self-moving module comprises a first charging contact group and a second charging contact group, the first charging contact group is connected to the first energy unit 13 to charge the same, and the second charging contact group is connected to the second energy unit 33 through the first energy interface 171 and the second energy interface 373 to charge the second energy unit. In another design solution of such embodiment, the charging interface of the self-moving module only comprises a group of charging contact group, and the charging contact group is connected to the first energy unit 13 to charge the same, and can be connected to the second energy unit 33 through the first energy interface 171 and the second energy interface 373 to charge the same.

In one optional embodiment, the working module 3 is directly connected to an external power source interface to receive charged energy. That is, the working module 3 has a charging module adaptive to the power source interface. The charging interface and the external power source interface are both a wireless charging interface. Since it is unnecessary to equip a special charging location and charging circuit for each working module 3, and the wireless charging interface solution can greatly reduce a charging cost when a plurality of working modules 3 exist.

In one optional embodiment, the working module 3 can have both the function of being charged through the self-moving module and the function of being charged through direct connection to the external power source interface. In one design solution of such embodiment, the working module 3 has a working interface and a second energy interface 371 which are independent from each other and are respectively configured to directly connect the power source interface and the first energy interface 171. In another design solution of such embodiment, the working module 3 can only have the second energy interface 371, and besides the first energy interface 171, the second energy interface 371 can also be directly connected to the external power source interface.

Figure 3:
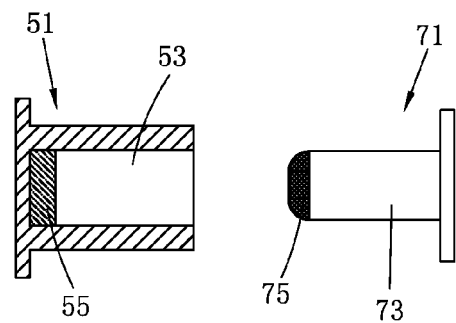
FIG. 3 is a schematic diagram of a first specific solution of a first mechanical interface and a second mechanical interface in FIG. 2.
Figure 4:
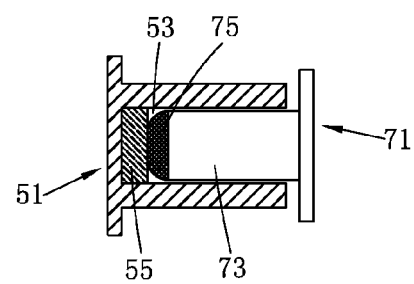
FIG. 4 is a schematic diagram that a connecting end and a matching-connecting end are in a connecting state in the solution of FIG. 3.
Figure 5:
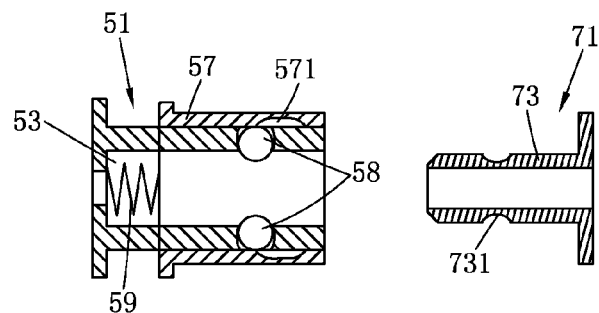
FIG. 5 is a schematic diagram of a second specific solution of a first mechanical interface and a second mechanical interface in FIG. 2.
Figure 6:
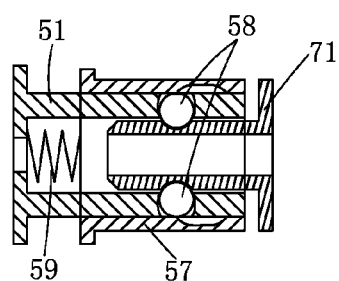
FIG. 6 is a schematic diagram that a connecting end and a matching-connecting end are in a connecting state in the solution of FIG. 5.

As shown in FIGS. 3 and 4, in one embodiment, the first mechanical interface 175 comprises at least one connecting end 51, the second mechanical interface 375 comprises at least one matching-connecting end 71, and the connecting ends 51 and the matching-connecting ends 71 are in one-to-one correspondence and are same in number. When the connecting ends 51 and the matching-connecting ends 71 are correspondingly connected one to one, connection between the first mechanical interface 175 and the second mechanical interface 375 is realized. The connecting end 51 comprises one containing hole 53, the matching-connecting end 71 comprises a bolt 73, and the containing hole 53 contains the bolt 73 in a shape-matching manner. In the containing hole, In one embodiment, one electromagnet 55 is disposed on the bottom of the containing hole, and generates a magnetic force when electrified, and on the bolt 73, In one embodiment, a material capable of attracting the electromagnet 55 is disposed on the top of the bolt, which is a permanent magnet in the present embodiment. After the bolt 73 is inserted into the containing hole 53, the permanent magnet 75 and the electromagnet 55 abut against each other, and by changing a magnetic pole direction of the electromagnet 55, the magnet poles of the abutted two ends are opposite or same. Thus, the self-moving module can connect or unload the working module 3 by controlling a magnetic pole direction of the electromagnet 55. In other embodiments, the magnetic pole direction of the electromagnet 55 can be fixed, the magnetic poles of the two abutted magnetic poles are always kept opposite in a electrified state, and by optionally electrifying or disconnecting power of the electromagnet 55, the working module is correspondingly connected or unloaded.

In one embodiment, two connecting ends 51 and two matching-connecting ends 71 are respectively disposed, which can be matched-connected one to one, and better connection stability is realized.

Specific disposing manners of the connecting end 51 and the matching-connecting 71 in FIGS. 3 and 4 are exemplary, and with such thought, there are many possible transformation manners. For example, the disposing locations of the electromagnet 55 and the permanent magnet 75 are interchangeable or the containing hole 53 is disposed in the second mechanical interface 375 and the bolt 73 is disposed on the first mechanical interface 175. For another example, in order to guide a jointing direction, the containing hole 53 is designed into a conical hole, and the bolt 73 is designed into a cone shape. For example, the containing hole 53 and the bolt 73 are cancelled and mutual connection is realized directly depending on an electromagnetic force, etc.

Figure 7:
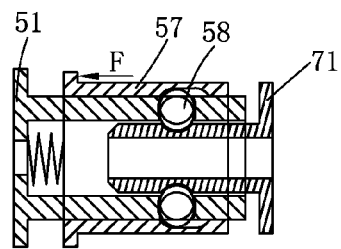
FIG. 7 is a schematic diagram that a connecting end and a matching-connecting end are removed from a connecting state in the solution of FIG. 5.
Figure 8:
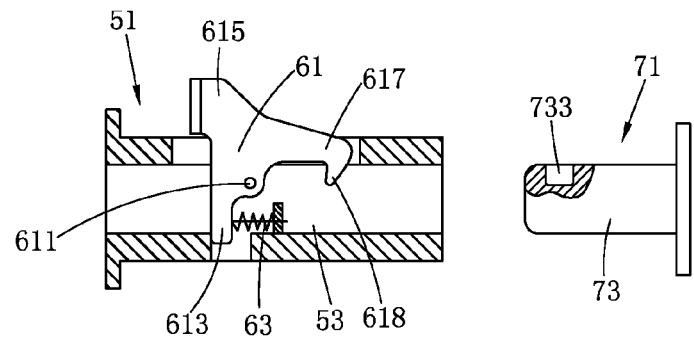
FIG. 8 is a schematic diagram of a third specific solution of a first mechanical interface and a second mechanical interface in FIG. 2.
Figure 9:
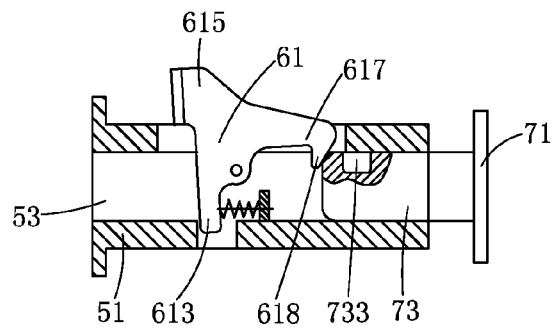
FIG. 9 is a schematic diagram that a connecting end and a matching-connecting end are switched to a connecting state from a non-connecting state in the solution of FIG. 8.
Figure 10:
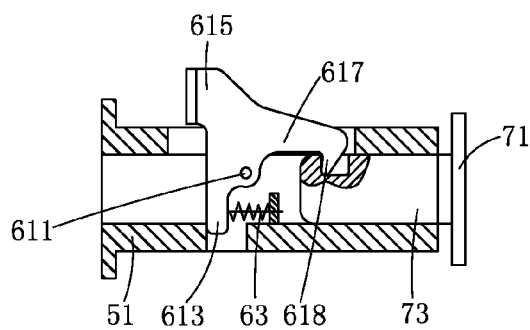
FIG. 10 is a schematic diagram that a connecting end and a matching-connecting end are in a connecting state in the solution of FIG. 8.
Figure 11:
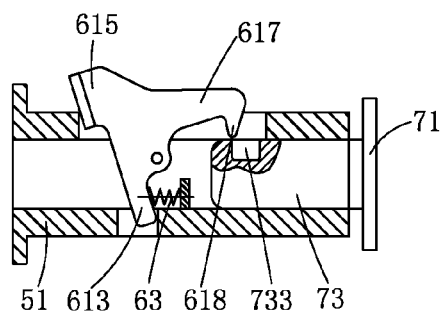
FIG. 11 is a schematic diagram that a connecting end and a matching-connecting end are removed from the connecting state in the solution of FIG. 8.
Figure 12:
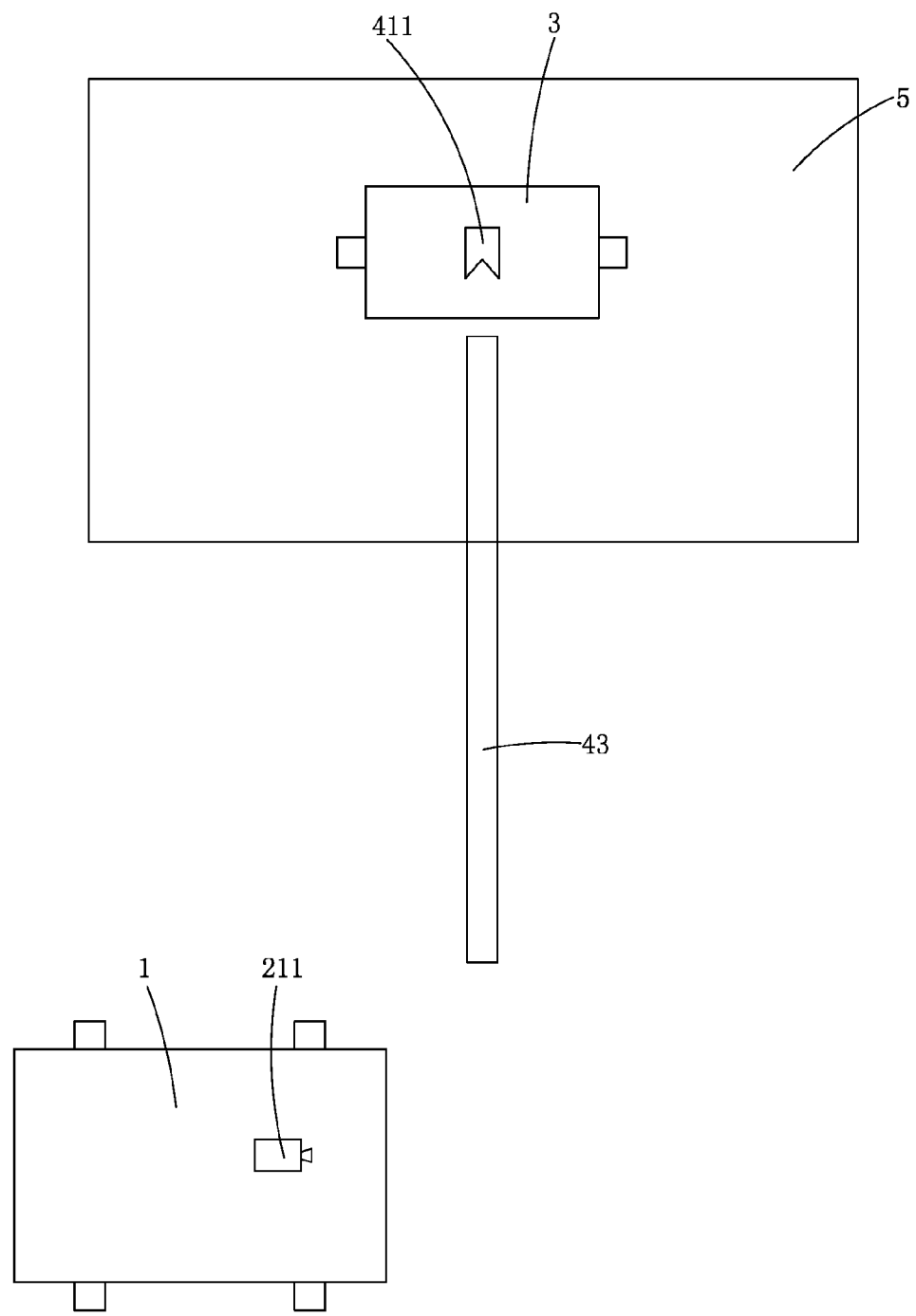
FIG. 12 is a schematic diagram that a self-moving module automatically seeks for and is automatically connected to a working module of one embodiment of the present invention.
Figure 13:
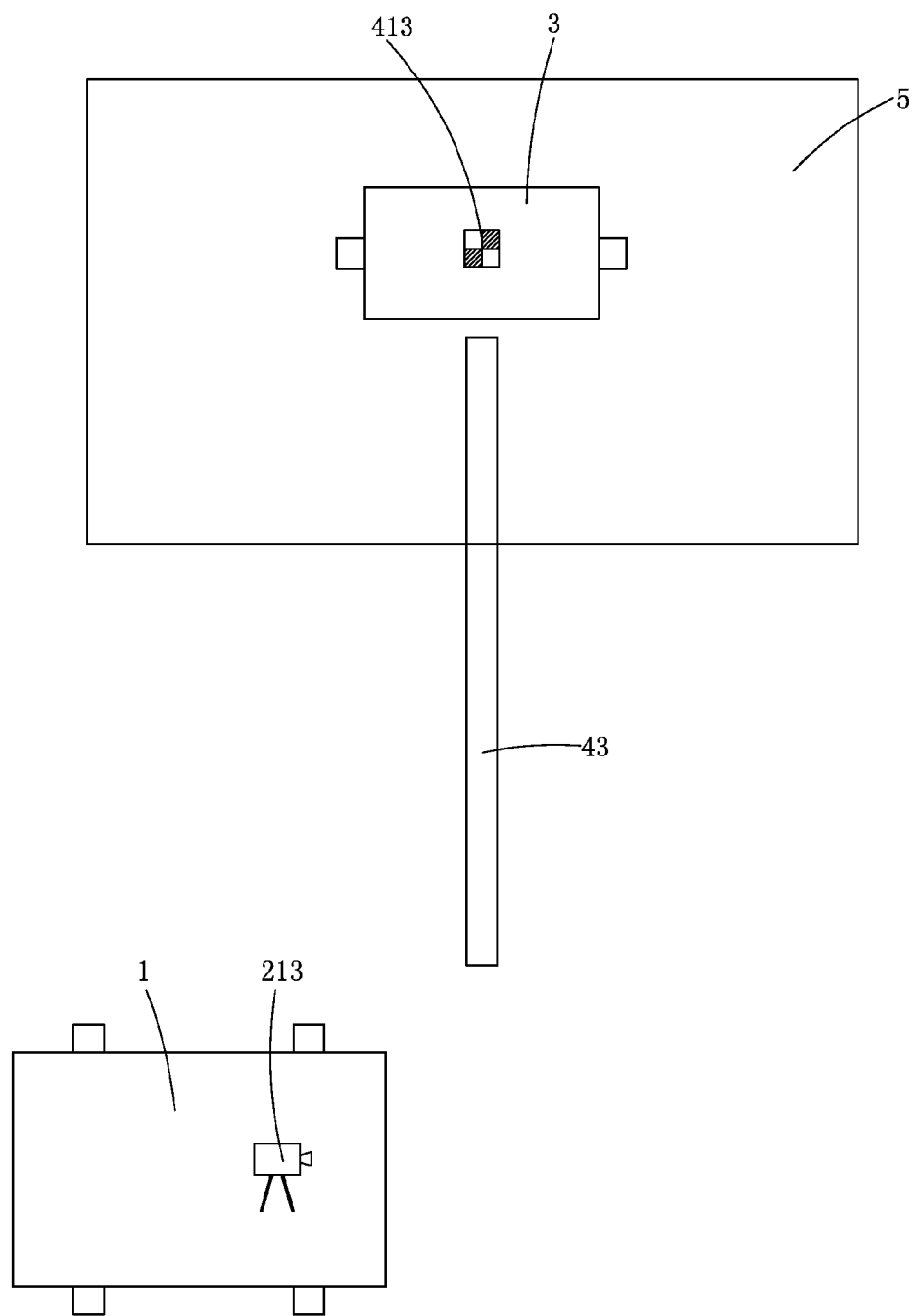
FIG. 13 is a schematic diagram that a self-moving module automatically seeks for and is automatically connected to a working module of another embodiment of the present invention.

As shown in FIGS. 7, 8, and 9, in another embodiment, similarly, the first mechanical interface 175 comprises at least one connecting end 51, the second mechanical interface 375 comprises at least one matching-connecting end 71, and the second mechanical interface 375 comprises at least one matching-connecting end 71, and the connecting ends 51 and the matching-connecting ends 71 are in one-to-one correspondence and are same in number. The connecting end 51 comprises a containing hole 53, and the matching-connecting end 71 comprises a bolt 73. A difference is that in the present embodiment, the self-moving module 1 and the working module 3 are not connected through an electromagnetic force, and are connected through a clamping ball-clamping groove matching-connecting structure.

Specifically as shown in FIG. 7, the side wall of the containing hole 53 has a plurality of through holes, a clamping ball 58 is inseparably contained in each through hole, a diameter of the clamping ball 58 is slightly larger than a thickness of the through hole and the clamping ball 58 can move back and forth along a through direction of the through hole. A sliding bush 57 also sleeves the side wall of the containing hole 53, the locations of the sliding bush 57 corresponding to the locations of the through holes are correspondingly provided with a plurality of containing grooves 571, and the clamping balls 58 can be partially contained in the containing grooves 571, can be separated from the containing holes after entering the containing grooves 571, and can be separated from the containing grooves 571 when entering the containing holes 53. The sliding bush 57 can move front and back along the side wall of the containing hole 53, and one spring 59 abuts against the sliding bush 57 to cause the containing grooves 571 to be departed from the through holes. The side wall of the bolt 73 is provided with clamping grooves 731 consistent with the through holes in number.

As shown in FIG. 8, under a connecting state, the bolt 73 is inserted into the containing hole 53, the clamping ball 53 falls in the containing hole 53 and is clamped in the clamping groove 731, the spring 59 forces the sliding bush 57 to be in a location where the containing groove 571 gets away from the through hole, the side wall of the sliding bush 57 compresses the clamping ball 58 into the clamping groove 731, such that the interlocking connection between the connecting end 51 and the matching-connecting end 71 is realized and the interlocking connection between the self-moving module 1 and the working module 3 is also realized.

As shown in FIG. 9, when the self-moving module 1 and the working module 3 need to get out of the connection, only the sliding bush is required to be driven to move against a force of the spring 59, such that the containing groove 571 and the through hole are aligned, the sliding bush 57 is in an unlocking location, at this point, the self-moving module 1 and the working module 3 move oppositely in a manner of being separated from each other, then the clamping ball 58 is squeezed into the containing groove 571 to get away from the containing hole 53, and the interlocking connection between the self-moving module 1 and the working module 3 is removed.

In the present embodiment, connection between the self-moving module 1 and the working module 3 can be established and removed automatically. A permanent magnet can be disposed on the sliding bush 57, a matched location on the self-moving module 1 is provided with an electromagnet, then when connection is established, when the first interface unit 17 and the second interface unit 37 are aligned and approach to each other, the self-moving module 1 electrifies the electromagnet to attract the sliding bush 57 to move against a spring's force, the containing groove 571 and the through hole are aligned, after the bolt 73 enters the containing hole 53 in place, the self-moving module 1 disconnects power of the electromagnet, and the sliding bush 57 is rebounded to establish interlocking connection. When the connection is removed, similarly, the electromagnet attracts the sliding bush 57 to move to an unlocking location, after the self-moving module 1 moves and is removed from the connection, the electromagnet is powered off, and the sliding bush 57 is restored to the locking location.

As shown in FIGS. 10, 11, 12 and 13, in another embodiment, similarly, the first mechanical interface 175 comprises at least one connecting end 51, the second mechanical interface 375 comprises at least one matching-connecting end 71, and the connecting ends 51 and the matching-connecting ends 71 are in one-to-one correspondence and are same in number. The connecting end 51 comprises a containing hole 53, the matching-connecting end 71 comprises a bolt 73, and the containing hole 53 contains the bolt 73 in a shape-matching manner. Different from the former embodiment, the connecting end 71 is provided with a pivotable fastener 61, the fastener 61 is disposed by penetrating side walls of part of the containing holes 53, and has a first rotary arm 613, a second rotary arm 615 and a third rotary arm 617, and a pivoting shaft 611 located among the respective rotary arms. The first rotary arm and the third rotary arm are at least partially located in the containing hole, the first rotary arm is connected to an elastic member 63, and the tail end of the third rotary arm is provided with a clamping hook 618. The second rotary arm 615 is located outside the containing hole 53. The elastic member 63 obliquely presses the first rotary arm 613 toward a direction causing the third rotary arm to be in a locking location, and in the locking location, the clamping hook 618 is at least partially contained in the inner wall of the containing hole 53. In the embodiment of the present invention, the elastic member 63 comprises a spring seat and a spring, one end of the spring is mounted on the spring seat, and the other end is connected to the first rotary arm 613. The bolt 73 is provided with a bayonet 733, which is matched with the clamping hook 618 above. Specifically, the first rotary arm 613, the elastic member 63 and the pivoting shaft 611 are all basically located in the containing hole 53, the clamping hook 618 forms a slope toward the side wall outside the containing hole 53, in a process that the bolt 73 is inserted into the containing hole 53, the tail end of the bolt 73 compresses the slope of the clamping hook 618 to enable the clamping hook 618 to overcome an oblique pressure of the elastic member 63 and to move to an unlocking location from the locking location, in the unlocking location, the clamping hook 618 totally leaves from the inner wall of the containing hole 53, and then the bolt 73 is inserted into the containing hole 53 till the bayonet 733 advances to a location where the claming hook 618 is, at this point, the elastic member 63 forces the clamping hook 618 to be restored to the clamping location, the clamping hook 618 and the bayonet 733 are locked, such that the self-moving module 1 and the working module 3 are connected together.

The second rotary wall 615 is basically located outside the containing hole 53, when the working module 3 is required to be separated from the self-moving module 1, only the oblique pressure of the elastic member 63 needs to be overcome to poke the second rotary arm 615, the clamping hook 618 is separated from the bayonet 733, and then the working module 3 can be unloaded.

In the present embodiment, connection between the self-moving module 1 and the working module 3 can be established and removed automatically. A permanent magnet can be disposed on the second rotary arm 615, a matched location on the self-moving module 1 is provided with an electromagnet, then when connection is established, and when the first interface unit 17 and the second interface unit 37 are aligned and approach to each other, the self-moving module 1 electrifies the electromagnet to attract the second rotary arm 615 to move to an unlocking location against a spring's force, after the bolt 73 enters the containing hole 53 in place, the self-moving module 1 disconnects power of the electromagnet, the fastener 61 is rebounded, and the clamping hook 618 hooks the bayonet 733 to establish interlocking connection. When the connection is removed, similarly, the electromagnet attracts the second rotary arm 615 to move to the unlocking location, after the self-moving module 1 moves and is separated from the connection, the electromagnet is powered off, and the second rotary arm 615 is restored to a locking location.

Similarly, in one embodiment, two connecting ends 51 and two matching-connecting ends 71 are respectively disposed, which can be matched-connected one to one, and better connection stability is realized.

Similarly, the disposing manner of respective elements in the embodiment of the present invention can have many transformations, for example, locations of the containing hole 51 and the bolt 73 are interchanged, which are not repeated.

The locations of the first control interface 173 and the second control interface 373 are respectively correspondingly disposed, such that when the first mechanical interface 175 and the second mechanical interface 375 are jointed successfully, the first control interface 173 and the second control interface 373 can also be jointed. Since the first mechanical interface 175 and the second mechanical interface 375 have a locking function already, the first control interface 173 and the second control interface 373 may not be provided with locking-related structures, and can be mutually simply matched in an inserting-pulling manner. The first control interface 173 and the second control interface 373 can be wired or wireless communication structures as long as signal transmission can be realized.

Locations of the first energy interface 171 and the second energy interface 371 are correspondingly disposed, such that when the first mechanical interface 175 and the second mechanical interface 375 are jointed successfully, the first energy interface 171 and the second energy interface 371 can also be jointed. Since the first mechanical interface 175 and the second mechanical interface 375 already have the locking function, the first energy interface 171 and the second energy interface 371 may not be provided with locking-related structures, and can be mutually simply matched in an inserting-pulling manner. The energy interface is configured to transmit energy between the self-moving module 1 and the working module 3, and a specific structure and realizing principle are well known by those skilled in the art and are not repeated herein.

After the first interface unit 17 and the second interface unit 37 are jointed, the self-moving module 1 drives the working module 3 to cruise in the working area 7 through connection between the first mechanical interface 175 and the second mechanical interface 375, and controls the working module 3 to execute a specific working task through the connection between the first control interface 173 and the second control interface 373. In some embodiments, the self-moving module 1 and the working module 3 also transmit electric energy through the first energy interface 171 and the second energy interface 371.

In some embodiments, the self-moving module 1 is automatically jointed with a specific working module 3 according to a preset program, and cruises and executes specific working tasks in the working area 7 automatically.

The self-moving module 1 has a detecting unit to detect a target working module 3 to be sought. The detecting unit 21 detects the working module 3 and sends a detected result to the control unit 11. The control unit 11 judges whether the working module 3 required to be connected is detected according to the detected result, and when the judged result is yes, the control unit 11 controls a first walking unit 15 to walk, such that the self-moving module 1 is connected to the working module 3 required to be connected. For example, the detecting unit 21 is an RFID reader 211, while the working module 3 is provided with an RFID label 411, and the RFID labels 411 on different working modules 3 have different contents. Through such manner, when the self-moving module 1 approaches each working module 3, the RFID reader 211 can read the RFID label 211, the control unit 11 knows the specific type of the currently approached working module 3 according to the detected result sent by the RFID reader, when recognizing that the current working module 3 is a type to be sought, the self-moving module 1 enters a jointing program, and the first interface unit 17 and the second interface unit 37 are jointed to connect the working module 3 onto the self-moving module 1.

In the jointing program, the self-moving module 11 advances along a jointing direction, and the jointing direction is a direction in which the first interface unit 17 and the second interface unit 37 can be aligned with each other to be connected. Specifically, according to disposing positions of the RFID reader 211 and the RFID label 411, the self-moving module 1 can correspondingly judge an approximate direction and distance of the working module 3 when the specific RFID label is recognized, the self-moving module 1 adjusts a direction per se to the jointing direction according to estimated information, and moves to a direction in which the first interface unit 17 and the second interface unit 37 are close to and connected to each other, and jointing can be realized.

In an alternative embodiment, the self-moving module 1 advances along the jointing direction by recognizing a guiding unit 43 in the dock 3, the guiding unit 43 can be a guide line, magnetic strip, or the like carrying a specific electric signal, the guiding unit 43 is disposed along the jointing direction, and the self-moving module 1 uses a corresponding guidance sensing unit to recognize the guide line and magnetic strip. In an alternative embodiment, a parking location of the working module 3 is provided with a guide rail, which can guide the self-moving module to a precise jointing direction to assist jointing. The guide rail can be a splayed guiding lateral side with a wide outer part and a narrow inner part, and after entering the guide rail, wheels of the self-moving module 1 can be limited by the lateral side to gradually enter the accurate jointing direction; and the guide rail can also be a guide groove which is disposed with the wheels in an equal-width manner, and the guide groove guides the self-moving module to the accurate jointing direction. Of course, respective foregoing manners for confirming the jointing direction can be combined for use through various arraying combining manners to increase a jointing accuracy, for example, direction estimation of the RFID label, arrangement combined use of the guiding unit 43, etc., which is not repeated.

In the jointing program, the self-monitoring module 1 monitors whether the jointing is successful, and quits the jointing program if the jointing is successful and enters a working program or other programs. A manner for monitoring whether the jointing is successful is to monitor whether the first control interface 173 or the first energy interface 171 has a specific voltage, current, signal, or the like, which is not repeated. In the working program, the self-moving robot leaves from the dock 5, and cruises and executes a specific working task in the working area 7.

The self-moving robot brings a connected working module 3 back to the charging according to an external command or plans per se, and is disjointed from the working module 3. The self-moving robot is returned to the dock 5 at first, and a returning manner has been disclosed in prior art, for example, returned along a border, which is not repeated. After returned to the dock 5, the self-moving robot removes connection between the self-moving module 1 and the working module 3. In an alternative embodiment, the self-moving robot places the working module in the parking location along the jointing direction and then removes the connection between the self-moving module 1 and the working module 3, and the jointing direction can be confirmed through the guide rail or guide line as mentioned above. In one embodiment, there are multiple parking locations, no one-to-one corresponding relationship exists between the parking locations and the working modules 3, and the working modules 3 can be placed in any idle parking locations freely; in another embodiment, there is a one-to-one corresponding relationship between the parking locations and the working modules 3, and after placing the carried module 3 on the specific corresponding parking location, the self-moving module removes the connection between the self-moving module 1 and the working module 3. A connection removing manner is different according to different connection forms, for example, in the foregoing electromagnetic force jointing manner, the self-moving module 1 realizes connection removal by canceling the electromagnetic force on the electromagnetic force.

In another embodiment, the detecting unit 21 is an image capturing device 213, while a specific image identifier 413 is disposed on the working module 3, and the image identifiers 413 on different working modules 3 have different contents. The image identifier 413 can be a two-dimensional code, a bar code or other standard patterns. The image identifier 413 can also be a combination of other manners such as specific colors or specific shapes, etc. When approaching to each working module 3, the self-moving module 1 carries out image capturing and recognizing when approaching to each working module 3, judges the working module 3 carrying the image identifier to be the target working module 3 when recognizing the specific image identifier 413 such as a specific two-dimensional code, a bar code or other patterns corresponding to the target working module 3, and then enters the jointing program, and the first interface unit 17 and the second interface unit 37 are jointed to connect the target working module 3 on the self-moving module 1.

In the jointing program, the self-moving module 1 advances along the jointing direction similarly. Specifically, according to the size of the recognized image identifier 413, a disposing manner of the image identifier 413, and the like, the self-moving module 1 can correspondingly estimate an approximate direction and distance of the target working module 3 when the specific image identifier 413 is recognized, the self-moving module 1 adjusts a direction per se to the jointing direction according to estimated information, and moves to a direction in which the first interface unit 17 and the second interface unit 37 are close to and connected to each other, and jointing can be realized.

Similarly, in an alternative embodiment, the self-moving module 1 advances along the jointing direction by recognizing the guiding unit 43 in the dock 5, or assists jointing through the guide rail, and a specific manner is as mentioned above and is not repeated. Of course, the respective foregoing manners for confirming the jointing direction can be combined for use through various arraying combining manners to increase a jointing accuracy.

In the jointing program, a manner for monitoring whether the self-moving module 1 is jointed successfully is as mentioned above and is not repeated.

The self-moving robot also brings a connected working module 3 back to the charging according to an external command or plans per se, and is disjointed from the working module 3. The specific manner is as mentioned above and is not repeated.

In another embodiment, similarly, the detecting unit is an image capturing device, a difference from the former embodiment is that the working module 3 has no specific image identifier, and the self-moving module 1 judges whether it is the target working module 3 by recognizing the shape, color, texture or a combination thereof of the working module 3.

In other embodiments, the self-moving module 1 also has a detecting unit 23, but a difference from each embodiment mentioned above is that the detecting unit 23 and the working module 3 have features or identifiers in a corresponding external environment instead of directly recognizing the features on the working module 3 or the identifier of the working module. For example, each specific working module 3 is parked at a specific parking location of the dock 5, and the specific parking location has a working module identifier corresponding to the specific working module 3. When seeking for the specific target working module 3, the self-moving module 1 only needs to seek for the working module identifier corresponding to the target working module 3 and located in the specific location, then the target working module 3 can be located, then the jointing program is entered, and the first interface unit 17 and the second interface unit 37 are jointed to connect the target working module 3 on the self-moving module 1. In these embodiments, optionally, the detecting unit 23 also recognizes the features on the working module 3 or the identifier of the working module, its specific implementing manner and corresponding arrangement on the working module 3 are mentioned as the former embodiment and are not repeated here anymore.

For example, in the optional embodiment, the dock 5 has a plurality of docking locations, each parking location is respectively configured to park different specific working modules 3, and respective specific RFID labels 411 are disposed in respective parking locations. While the detecting unit 23 on the self-moving module 1 is an RFID reader 211, Through such manner, when the self-moving module 1 approaches to each working modules 3, an RFID label 211 can be read, further a specific type of the working module 3 that is currently approached can be known, when recognizing that the current working module 3 is in the type to be sought, the self-moving module 1 enters a jointing program to joint the first interface unit 17 and the second interface unit 37 so as to connect the target working module 3 onto the self-moving module 1.

For another example, in another optional embodiment, similarly, the dock 5 has a plurality of parking locations for parking different specific working modules 3, a difference is that the detecting unit 23 is an image capturing device, while a specific image identifier 413 is disposed on the parking location and the image identifiers 413 on the parking locations where different specific working modules 3 are at are different from one another. The image identifier 413 can be a two-dimensional code, a bar code or other standard patterns. The image identifier 413 can also be a combination of other manners such as specific colors or specific shapes, etc. The image identifier 413 can be located on the bottom surface in an entrance of the parking location, and can also be located behind the parking location or on the upright wall of the side surface, and of course, other locations proper for the image capturing devices 213 can also be used. The self-moving module 1 carries out image capturing and recognizing when approaching to each working module 3, judges the working module 3 carrying the image identifier to be the target working module 3 when recognizing the specific image identifier 413 such as a specific two-dimensional code, a bar code or other patterns corresponding to the target working module 3, and then enters the jointing program, and the first interface unit 17 and the second interface unit 37 are jointed to connect the target working module 3 on the self-moving module 1.

In another embodiment, similarly, the dock 5 has a plurality of parking locations to park different specific working modules 3, and a difference is that the working identifier in the parking location is a guiding identifier guiding the self-moving module to be jointed with the working module. In such embodiment, it is unnecessary to separately dispose the guiding unit 43 in the former embodiment in the dock. In one alternative embodiment, the guiding identifier is a guide line carrying an electric signal, the guide lines corresponding to different specific working modules 3 have different electric signals, for example, different current frequencies, or the carried electric signals have different waveforms, etc., which is not repeated. The detecting unit 23 correspondingly comprises an inductor inducing an electromagnetic signal generated by the guide line in the environment. The guide line is disposed on the bottom surface of the parking location and extends out of the parking location, after recognizing the electric signal corresponding to the target working module 3, the self-moving module 1 accurately approaches the target working module 3 in the parking location by walk along the guide line where the electric signal is generated, the guide line is disposed to correspond to a jointing track, and the self-moving module 1 can be accurately jointed with the working module 3 as long as it walks along the guide line. "Walks along the guide line" can be "walks across the guide line or walk against the guide line by a certain distance".

In another embodiment, similarly, the dock 5 has a plurality of parking locations to park different specific working modules 3, and the specific identifier in the parking location is a guiding identifier guiding the self-moving module 1 to be jointed with the working module 3. A difference from the former embodiment is that the guiding identifier is a magnetic track, the magnetic tracks corresponding to different specific working modules have different parameters, for example, different intensities of magnetic fields, et., and the detecting unit 23 corresponds to a magnetic induction sensor recognizing the magnetic track. Other content is same as the former embodiment and is not repeated.

A working plan manner of the self-moving robot is introduced below.

At first, the self-moving robot has a well-set working period and nonworking period, in the working period, the self-moving robot executes various working tasks and is automatically returned to the dock 5 to be charged after energy is used up, and in the nonworking period, the self-moving robot does not work and is parked in the dock 5. Typically, a user can set eight o'clock to eighteen o'clock from Monday to Friday as the working period and other time as the nonworking period.

In the working period, the self-moving module 1 carries each working module 3 for working in sequence according to a set time sequence. For example, when each working module 3 comprises a mowing module, a fertilizing module and a watering module, the self-moving module 3 firstly connects the mowing module to mow for three hours, then the fertilizing module is connected to fertilize for three hours, and finally the watering module is connected to water for three hours. During the mowing work, the self-moving module 1 and the mowing module periodically enter the working area for mowing the lawn, and are returned to the charging station to be subjected to energy replenishment, and the operation is similar during the fertilizing work and the watering work.

A second embodiment of the present invention is introduced in combination with FIGS. 14-18.

Figure 14:
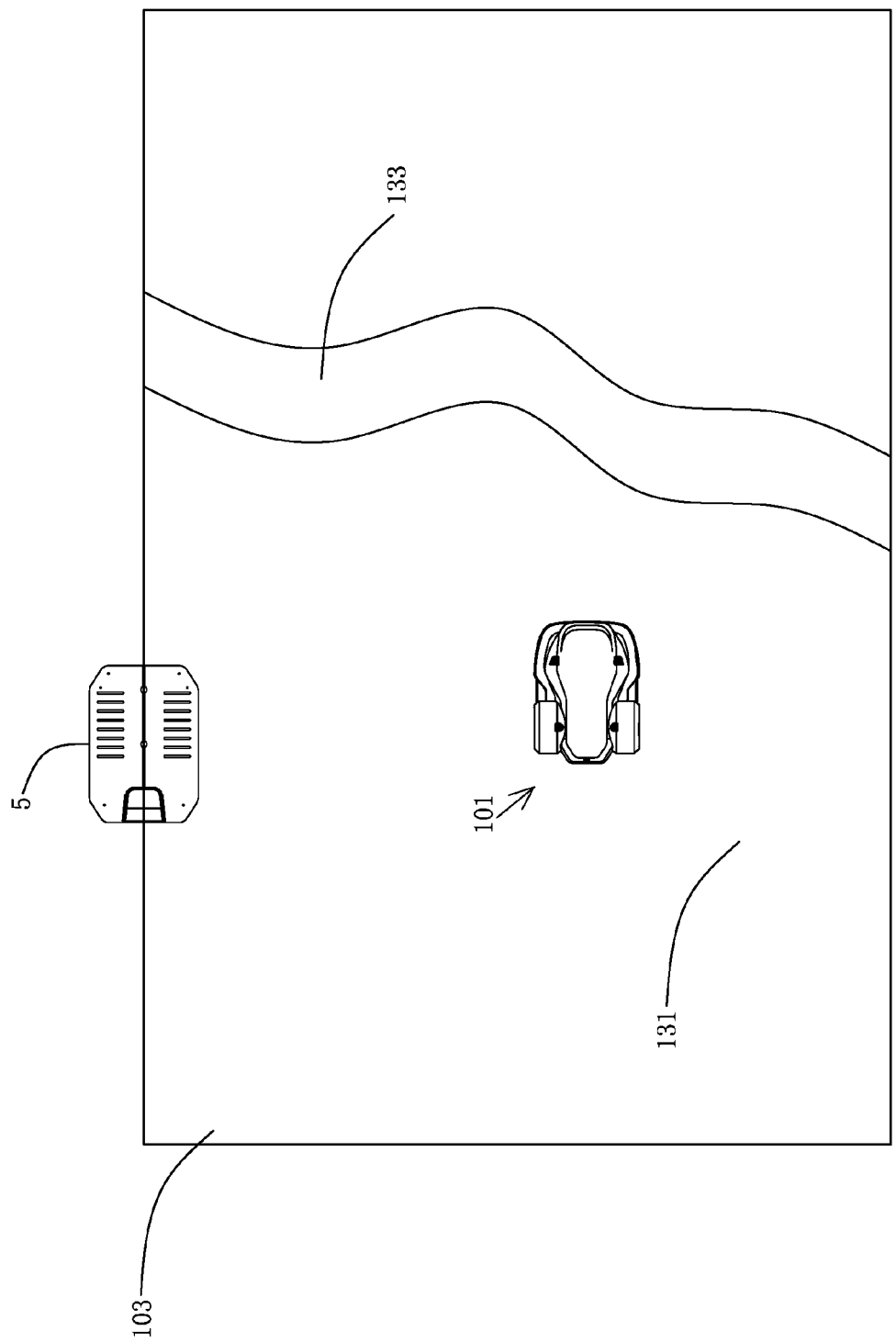
FIG. 14 is a schematic diagram of a self-moving robot system of one embodiment of the present invention.
Figure 15:
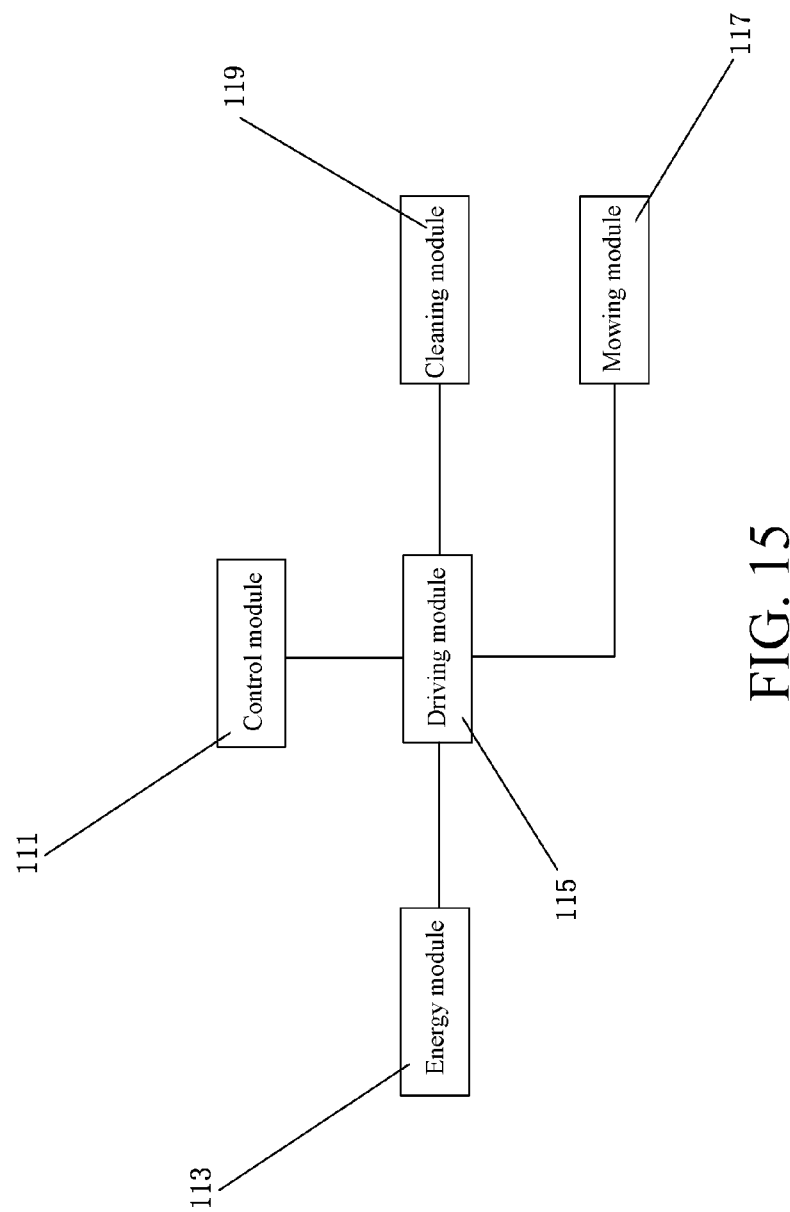
FIG. 15 is a module diagram of a self-moving robot of one embodiment of the present invention.

The self-moving robot system as shown in FIG. 14 comprises a self-moving robot 101 and a dock 5. The self-moving robot automatically cruises and executes work in the working area 103, and the dock 5 allows the self-moving robot to park. The working area 103 comprises a grassland 131 and a road surface 133, a turf exists above the grassland 131, there is no turf above the road surface 133 for people and cars to walk, the road surface 133 not only comprises a narrow path but also comprises a wide non-grassland area for people to stop or move, for example, a courtyard without grass and a sports ground, etc.

In one embodiment, the self-moving robot system comprises a virtual border, for example, a border wire, an infrared wall or an RFID label, etc., around the working area 3; and in one embodiment, the virtual border divides the working area 3 into a plurality of subareas, for example, at least one grassland area and at least one road surface area.

Reference is continuously made to FIG. 1, the dock 5 allows the self-moving robot 101 to work when not in work, and in one embodiment, the dock 5 is provided with a power source interface which charges the self-moving robot 101.

As shown in FIG. 2, the self-moving robot 101 comprises a control module 111, an energy module 113, a driving module 115, a mowing module 117 and a cleaning module 119, and further comprises a shell for mounting the respective units above.

A specific physical form is configured as a control circuit board where one or more processors, storages, other relates elements and corresponding peripheral circuits are disposed. A control program is disposed in the control unit to execute a predetermined command, and the self-moving robot 101 is controlled to operate and cruise and work in the working area 103, to return to the dock 5, etc. The energy module 113 provides working energy for the self-moving robot 101 and can be a proper energy storage such as a chargeable battery pack and a solar energy collecting and storage device. The driving module drives 115 drives the self-moving robot 101 to move on the ground, and usually comprises a wheel set, and can also comprise a track, a mechanical foot, etc., the driving module 115 can comprise a special power source, such as a driving motor, and can also share a power source with other modules. The mowing module 117 is configured to execute mowing and comprises a cutting element such as a cutter head carrying a throwing blade, a cutter bar or mowing rope; the mowing module 117 can comprise a special power source, such as a driving motor, and can also share a power source with other modules. The cleaning module 119 is configured to execute ground cleaning work, for example, sweeping, dust collecting, fallen leaf blowing, fallen leaf sucking, etc., the cleaning module 119 can comprise a sweeping module, an air sucking module, a blowing module or blowing-sucking module, etc., and the cleaning module 119 can comprise a special power source, such as a driving motor, and can also share a power source with other modules.

The self-moving robot 101 has a mowing mode and a cleaning mode, under the mowing mode, the self-moving robot 101 can automatically cruise and execute mowing work on the grassland 131, and under the cleaning mode, the self-robot 1 can automatically cruise and execute cleaning work. When executing the mowing work, the mowing module of the self-moving robot 101 is started and the cleaning module is stopped; and on the contrary, when cleaning work is executed, the mowing module is stopped and the cleaning module is started. Under the cleaning module, according to different application scenarios, in some embodiments, the self-moving robot merely executes cleaning work on the grassland; and in some other embodiments, the self-moving robot executes cleaning work on the grassland; in some other embodiments, the self-moving robot merely executes cleaning work on the grassland and the road surface; and in some other embodiments, the self-moving robot optionally executes cleaning work on the grassland merely or on the road surface merely, or executes cleaning work on the grassland and the road surface. For example, when the cleaning module mainly executes the road surface sweeping work, the self-moving robot merely executes the cleaning work on the road surface under the cleaning mode; and when the cleaning module mainly executes the fallen leaf cleaning work and fallen leaves fall on the grassland, the self-moving robot executes cleaning work on the road surface and the grassland.

In some embodiments of the present invention, the self-moving robot 101 also comprises a ground recognizing unit 121 so as to recognize a ground type to be the grassland or road surface. In some embodiments, when the self-moving robot moves to the area of the road surface 133 from the area of the grassland 131, the ground recognizing unit 121 will transmit a recognized result of the target area to the control module 111, the control module 111 controls the self-moving robot to be converted to the cleaning mode from the mowing mode, that is, the mowing module is stopped and the cleaning module is started. When the self-moving robot moves from the area of the road surface 133 toom the area of the grassland 131, the ground recognizing unit 121 will transmit a recognized result of the target area to the control module 111, the control module 111 controls the self-moving robot to be converted to the mowing mode from the cleaning mode, that is, the cleaning module is stopped and the mowing module is started.

In one embodiment, the ground recognizing element 121 comprises a camera and a recognizing element connected to the camera. The camera captures a ground image of the target area and transmits to the recognizing unit, a ground type judging algorithm is preset in the recognizing element, and the recognizing element extracts image features and transmits to the ground type judging algorithm to judge the target area to be the grassland or road surface. The image feature can be different along with different ground type judging algorithms. In one embodiment, the image features comprise a color pixel value of a target area image, the ground type judging algorithm is to form obtained pixel values into a color distribution map, a peak value area with the most color areas in the distribution map is compared with preset area values, if the peak value area in the distribution map is between the preset area values, then the ground type is judged to be grassland, otherwise, the ground type is judged to be the road surface. In some embodiments, the ground preset algorithm can adopt other image-based grassland recognizing algorithms, which are not enumerated one by one here.

In one embodiment, the ground type recognizing unit 121 comprises a ground hardness sensor and a recognizing element connected to the ground hardness sensor. The ground hardness sensor comprises ground hardness information of the target area and transmits to the recognizing element, a ground type judging algorithm is preset in the recognizing element, and the recognizing element inputs ground hardness information to the ground type judging algorithm to judge the target area to be the grassland or road surface. According to different adopted hardness sensors, the ground hardness sensors can be disposed in different locations of the self-moving robot. In one embodiment, the ground hardness sensor can be disposed on a wheel of the self-moving robot, and configured to detect a ground hardness value in real time. In other embodiments, the ground hardness sensor can be disposed on a shell of the self-moving robot. The ground type judging algorithm judges the ground type of the target area according to a ground hardness given by the ground hardness sensor, and judges the target area to be the road surface when the ground hardness value is larger than or equal to a preset value, otherwise judges the target area to be the grassland. In some embodiments, the ground preset algorithm can adopt other hardness information-based road surface recognizing algorithms.

In one embodiment, the ground type sensor can be disposed on the border between the grassland 131 and the road surface 133. When the self-moving robot approaches to the border between the grassland 131 and the road surface 133, the ground hardness sensor can emit a notifying signal to the self-moving robot. The ground type judging algorithm judges whether the self-moving robot enters the grassland or the road surface according to different received notifying signals.

In one embodiment, the control module 111 also comprises a mode control unit. The mode control unit controls the self-moving robot to be switched between the mowing mode and the cleaning mode according to a preset program. The mode control unit allocates time when the self-moving robot is in the mowing mode and time when the self-moving robot is in the cleaning mode according to date or season information. In one embodiment, the preset program can store a time ratio table of time when the self-moving robot is in the mowing mode to the time when the self-moving robot is in the cleaning mode according to growth rhythms of grass in respective regions of the whole world, and these rhythms can be known through data of meteorological statistics. For example, a growth speed of the grass in the Chinese region is fastest in summer, then is slower in spring and autumn and is slowest in winter, and then the time ratio table in the preset program is as shown in Table 1

TABLE 1

| Season | Date | | | |
|---|---|---|---|---|
| | February-April | May-July | August-October | November-January of the next year |
| Mowing time ratio | 80% | 100% | 20% | 0% |
| Cleaning time ratio | 20% | 0% | 80% | 100% |

Table I merely gives percent data of one embodiment, and for a specific time ratio of the mowing mode and the cleaning mode in specific time, a user can set according to an own location or a habit.

Figure 16:
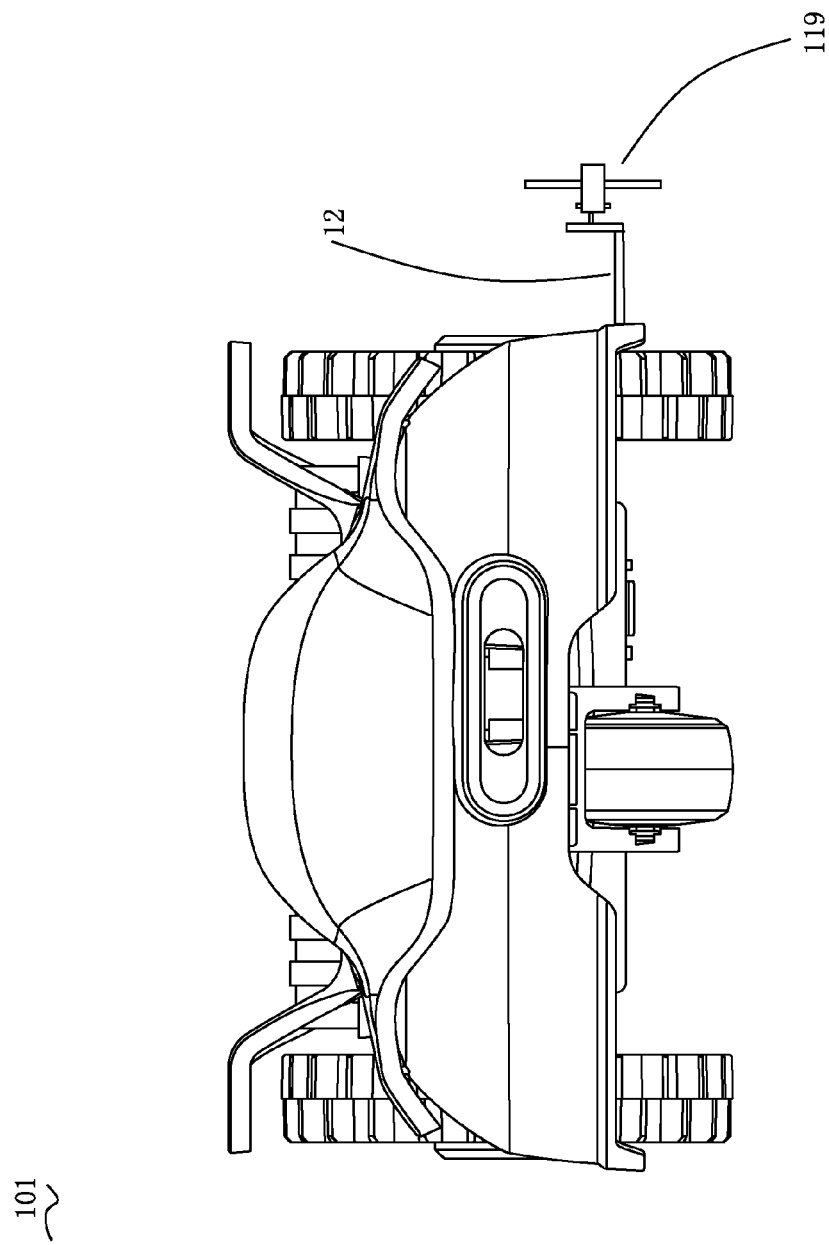
FIG. 16 is a front view schematic diagram of a turning up state of a side wing of a self-moving robot of one embodiment of the present invention.
Figure 17:
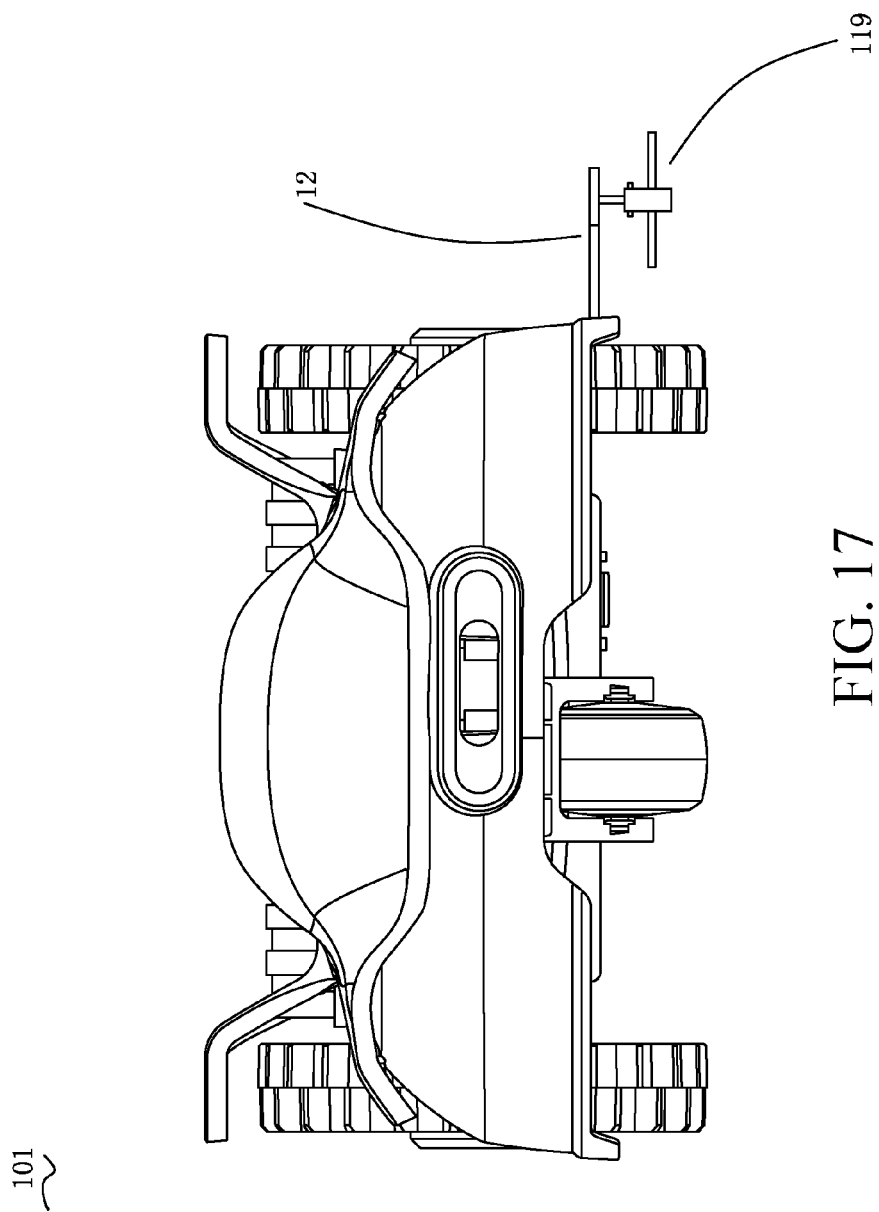
FIG. 17 is a front view schematic diagram of a falling-down state of a side wing of a self-moving robot in FIG. 16.

In the embodiment of the present invention, the cleaning module 119 is a leaf cleaning module, which is a blowing module, air sucking module or sweeping module. The sweeping module 119 can be located below or aside of the shell of the self-moving robot. In one embodiment, as shown in FIGS. 16 and 17, a movable side wing 12 is disposed aside the shell of the self-moving robot 101, and the side wing 12 is provided with a cleaning module 119. As shown in FIG. 16, when in the mowing mode, the side wing 12 is folded against the lateral side of the shell; and as shown in FIG. 17, when in the cleaning mode, the side wing 12 falls down, and the cleaning module operates to work under driving of the driving module.

Figure 18:
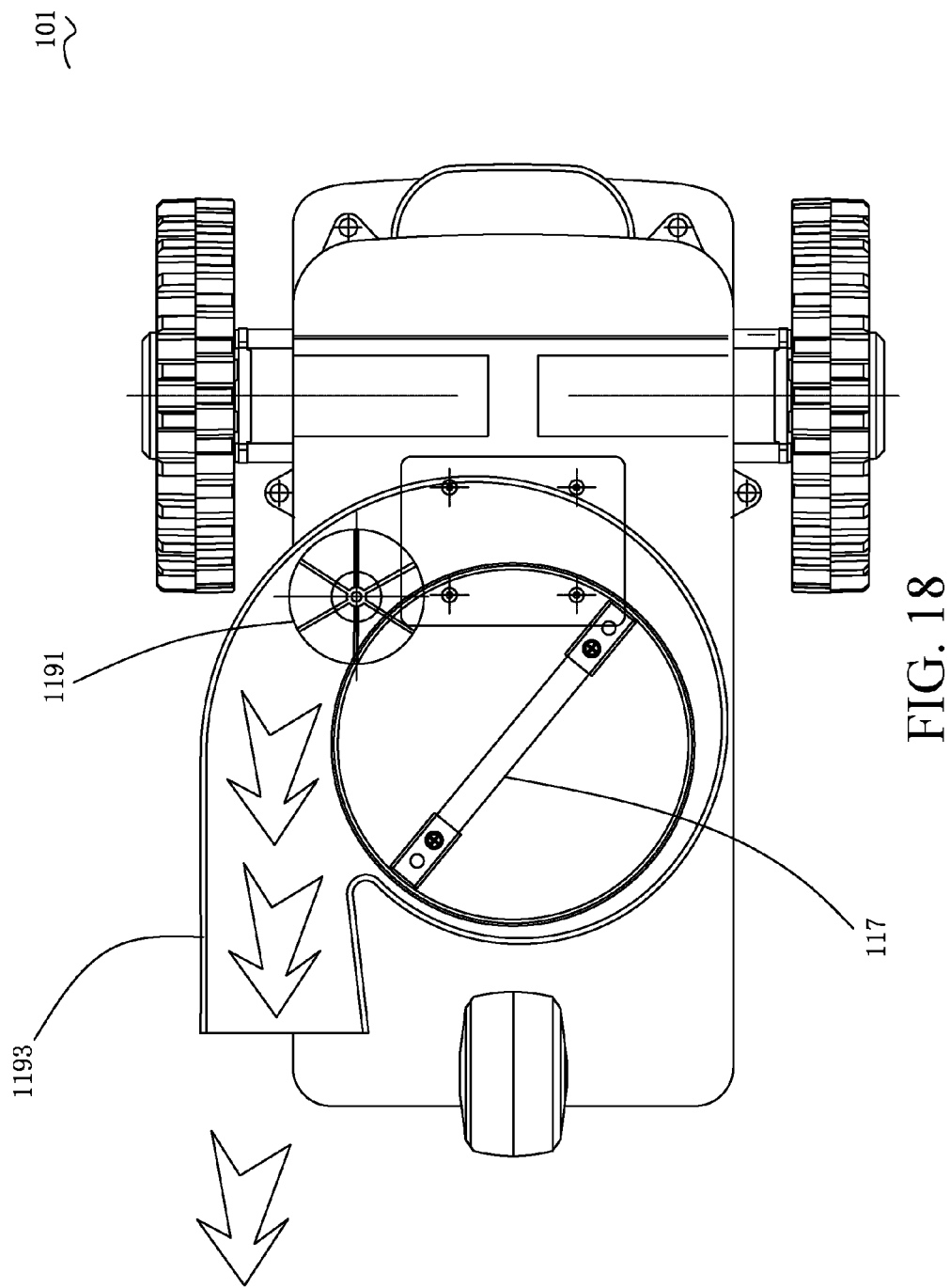
FIG. 18 is a bottom schematic diagram of a self-moving robot of one embodiment of the present invention.

In one embodiment, the cleaning module 119 is a blowing module. The blowing module can comprise a fan 1191, and the fan drives the airflows to move to blow garbage such as leaves or dust scattered on the road surface away or together. In one embodiment, as shown in FIG. 18, the blowing module comprises a fan 1191 and an air duct 1193 communicated with the fan 1191, and the fan 1191 is located below the shell of the self-moving robot 101. When the cleaning module is started, the driving module drives the fan 1191 to generate airflows, which blow toward the road surface through the air duct 1193, so as to blow garbage, such as leaves or dust around the air duct opening, away or together. In other embodiments, the blowing module can also be located aside the shell of the self-moving robot.

In one embodiment, the cleaning module 119 is an air sucking module, comprising a fan, an air duct and a dust collecting device, and garbage such as leaves or dust on the road surface is sucked into the dust collecting device by generating airflows through the fan. The air sucking module can be located below or aside the shell of the self-moving robot. In one embodiment, the air sucking module may not comprise the dust collecting device, and the garbage such as leaves or dust is directly discharged through a dust discharging port.

In one embodiment, the cleaning module 119 is a sweeping module. Specifically, the sweeping module can be a sweeping brush or roller. The sweeping module can be located below the aside the shell of the self-moving robot. In one embodiment, the sweeping module is located below the shell, and when the cleaning mode is started, the driving module drives the sweeping module to operate to sweep the road surface.

In one embodiment, the cleaning module 119 is detachably mounted on the shell. When the cleaning module is damaged or too dirty, a user can detach the cleaning module for replacement or cleaning. A detachable structure comprises a common fastener connecting structure, such as bolt-nut connection, screw connection and the like; and the detachable structure also comprises fastener-free connection, such as buckle connection, and shape connection.

The present invention is not limited to the listed specific embodiment structures, and the structures based on the concept of the present invention all belong to a protective scope of the present invention, A third specific embodiment of the present invention is further explained in detail in combination with FIGS. 19-22.

FIG. 1 is a self-moving robot system of one embodiment of the present invention, and is an autonomous mower system 201 specifically, which is disposed on the ground 202. Usually, the ground 202 is divided into a working area (not shown) and a nonworking area (not shown), between which a border line forms a border.

The autonomous mower system 201 comprises a dock 204 and an autonomous mower 210 configured to automatically walk and mow on the ground 202, and the dock 204 is disposed on the peripheral border of the working area generally.

Figure 19:
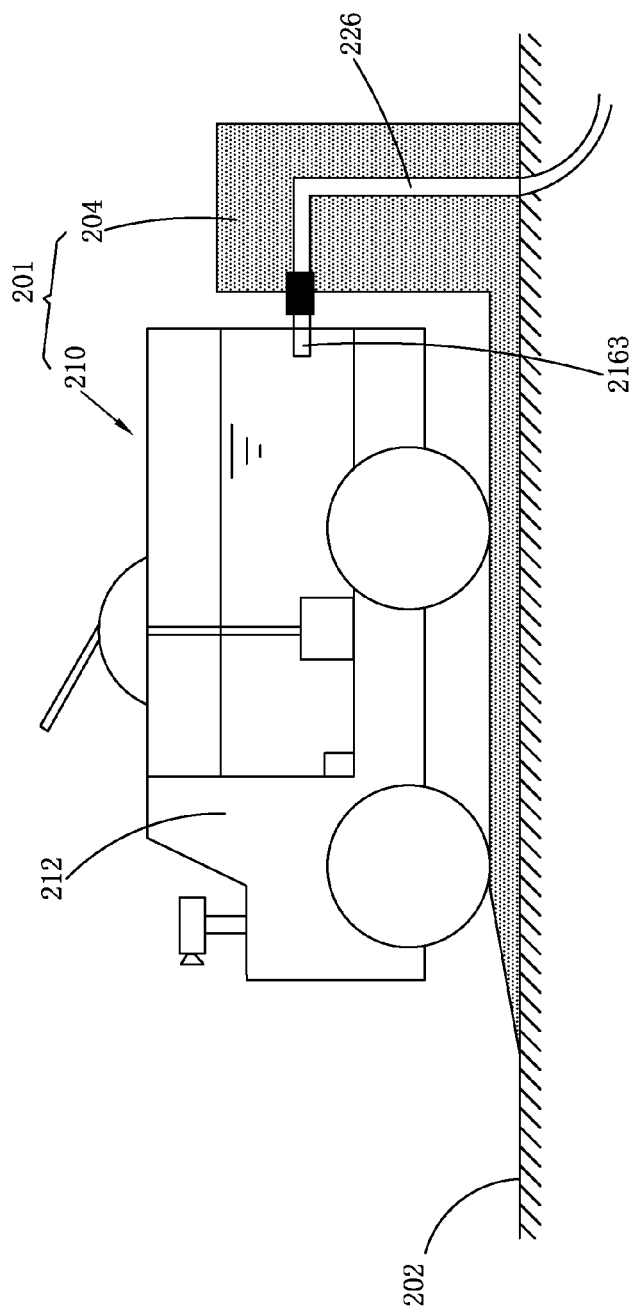
FIG. 19 is a schematic diagram of an autonomous mower system provided by an embodiment of the present invention.
Figure 20:
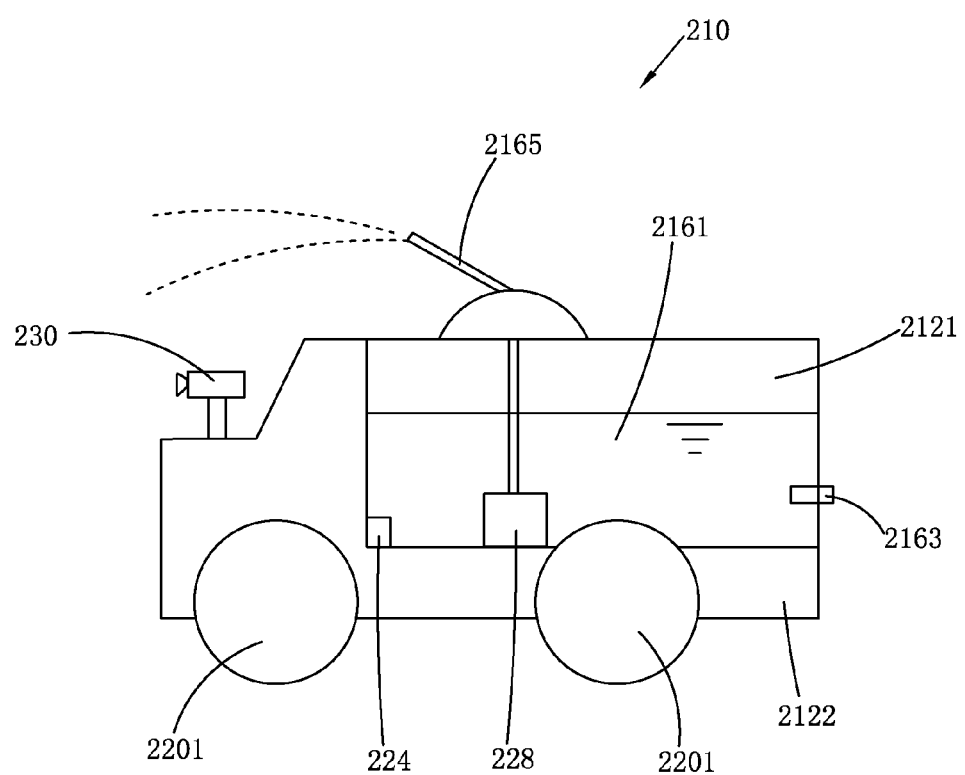
FIG. 20 is a schematic diagram when an autonomous mower in the autonomous mower system in FIG. 19 works in a liquid-sprinkling state.
Figure 21:
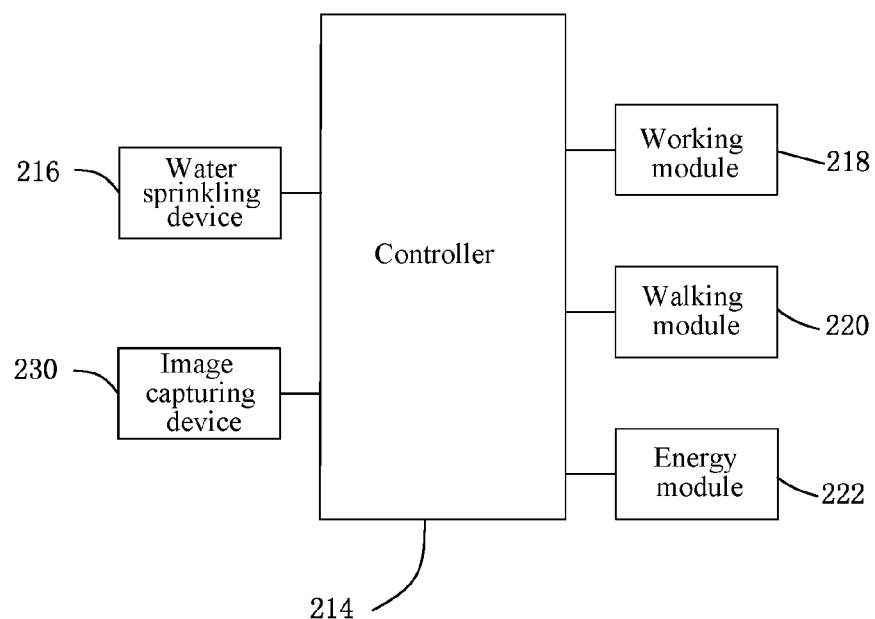
FIG. 21 is a module diagram of an autonomous mower in FIG. 20.

Reference is made to what are shown in FIGS. 19 to 21, FIG. 20 is a schematic diagram that the autonomous mower 210 is in a liquid sprinkling state, and FIG. 21 is a module diagram of the autonomous mower in FIG. 20.

The autonomous mower 210 comprises a shell 212, a containing cavity being formed in the shell 212, a controller 214 mounted in the containing cavity to control the autonomous mower 210 to automatically walk and mow and a liquid sprinkling device 216 controlled by the controller 214 to perform liquid sprinkling work.

The autonomous mower 210 further comprises a working module 218, a walking module 220, and an energy module 222. The controller 214 is connected to the liquid sprinkling device 216, the working module 218, the walking module 220 and the energy module 222.

The working module 218 is configured to execute specific work. In the present embodiment, the working module 218 is specifically a cutting module, and comprises a cutting part (not shown) for cutting and a cutting motor (not shown) driving the cutting part. Specifically, the shell 212 comprises a shell bottom 2122 and an opposite shell top 2121, the cutting part is mounted on the shell bottom 2122 and the cutting motor is mounted in the containing cavity of the shell 212.

The walking module 220 comprises a wheel set 2201 driving the autonomous mower 210 to walk and a walking motor (not shown) driving the wheel set 2201. Specifically, the wheel set 2201 is mounted on the shell bottom 2122, and the walking motor is mounted in the containing cavity of the shell 212. There are many disposing methods for the wheel set. Usually the wheel set comprises a driving wheel driven by a driving motor and an auxiliary wheel supporting the shell in an auxiliary manner, and one, two or more driving wheels can be disposed.

The energy module 222 is configured to provide energy for operation of the autonomous mower 210. Energy of the energy module 222 can be gasoline, a battery pack or the like, in the present embodiment, the energy module 222 comprises a chargeable battery pack (not shown) disposed in the shell 212. In work, the battery pack releases electric energy to keep the autonomous mower 210 working. When not in work, the battery can be connected to an external power source to replenish electric energy. Particularly, in view of a more humanized design, when the controller 214 detects that electricity of the battery is insufficient, the autonomous mower 210 will seek for the dock 204 for charging to replenish electric energy.

The liquid sprinkling device 216 is controlled by the controller 214, which can perform the liquid sprinkling work automatically. Specifically, the liquid sprinkling device 216 comprises a liquid box 2161 and a pipeline communicated with the liquid box 2161. The liquid box 2161 is mounted in the containing cavity for containing the liquid; one end of the pipeline is communicated with the liquid box 2161, and the other end extends out of the shell 212 from the containing cavity. The controller 214 is configured to control the liquid to get in or out of the liquid box 2161. Of course, the liquid here can be water, liquid fertilizer or pesticide.

In one embodiment, the pipeline comprises a first pipeline 2163 for liquid feeding and a second pipeline 2165 for liquid sprinkling, one end of the first pipeline is communicated with the liquid box 2161, and the other end extends out behind the shell 212; one end of the first pipeline 2165 is communicated with the liquid box 2161 and the other end extends out above the shell 212.

In order to better know a condition of a liquid level in the liquid box 2161, In one embodiment, the autonomous mower 210 also comprises a liquid level monitoring module 224, configured to monitor the liquid level in the liquid box 2161, and convert liquid level information in the liquid box 2161 into an electric signal capable of being recognized by the controller 214 and transmit to the controller 214, and the controller 214 judges whether liquid needs to be replenished to the liquid box 2161 according to the liquid level.

Besides charging the autonomous mower 210, the dock 204 is connected to a liquid supplying pipe 226 for replenishing liquid into the liquid box 2161 of the liquid sprinkling device 216. By taking water sprinkling as an example, when the controller 214 detects that water needs to be replenished to the liquid box 2161, the controller 214 controls the autonomous mower 210 to be returned to the dock 204, at this point, the first pipeline 2163 is jointed with the liquid supplying pipe 226, the controller 214 opens the first pipeline 2163 for water in the liquid supplying pipe 226 to enter the liquid box 2161 through the first pipeline.

Specifically, when the autonomous mower 210 performs liquid sprinkling work, the liquid level monitoring module 224 will detect the liquid level in the liquid box in real time, when the liquid level in the liquid box 2161 is in a preset liquid level range, the controller 214 controls the autonomous mower 210 to continuously perform the liquid sprinkling work; while when the liquid level is lower than the preset liquid level range, the controller 214 controls the liquid sprinkling device 216 to stop liquid sprinkling, meanwhile, the controller 214 controls the walking module 220 to enable the autonomous mower 210 to be returned to the dock 204 to replenish liquid to the liquid box 2161.

The autonomous mower 210 also comprises a liquid pump 228 mounted in the containing cavity, when the autonomous mower 210 performs the liquid sprinkling work, the controller 214 controls the liquid pump 228, which optionally enables the liquid in the liquid box 2161 to be sprinkled out from the second pipeline 2165.

In one embodiment, in order to improve walking regularity of the autonomous mower 210 and prevent work repeating or work omission of the autonomous mower 210, the autonomous mower 210 also comprises a path planning system, so as to improve working efficiency and quality.

Specifically, in the present embodiment, the path planning system is an image capturing module 230. The autonomous mower 210 comprises an image capturing module 230, configured to shoot a front area of the autonomous mower 210 and generate a picture corresponding to the front area, and the controller 214 is configured to parse the picture to determine a location and path of the autonomous mower 210. Thus, the autonomous mower 210 can perform mowing or liquid sprinkling work without repeating and omission in the working area according to a certain rule. Meanwhile, when the autonomous mower 210 performs mowing or liquid sprinkling work, if charging or liquid replenishing is required midway, the autonomous mower can be returned to the location where the mowing or liquid sprinkling is stopped last time in combination with the image capturing module 230, and working efficiency of the autonomous mower 210 is improved.

In another embodiment, the path panning system can be a locating device. The autonomous mower comprises the locating device (not shown), configured to recording walking coordinates when the autonomous mower performs the sprinkling work, the controller analyzes the coordinates to determine the location and path of the autonomous mower, and judges whether liquid has been sprinkled in the coordinate location, and if not, the controller controls the autonomous mower to perform sprinkling work.

Figure 22:
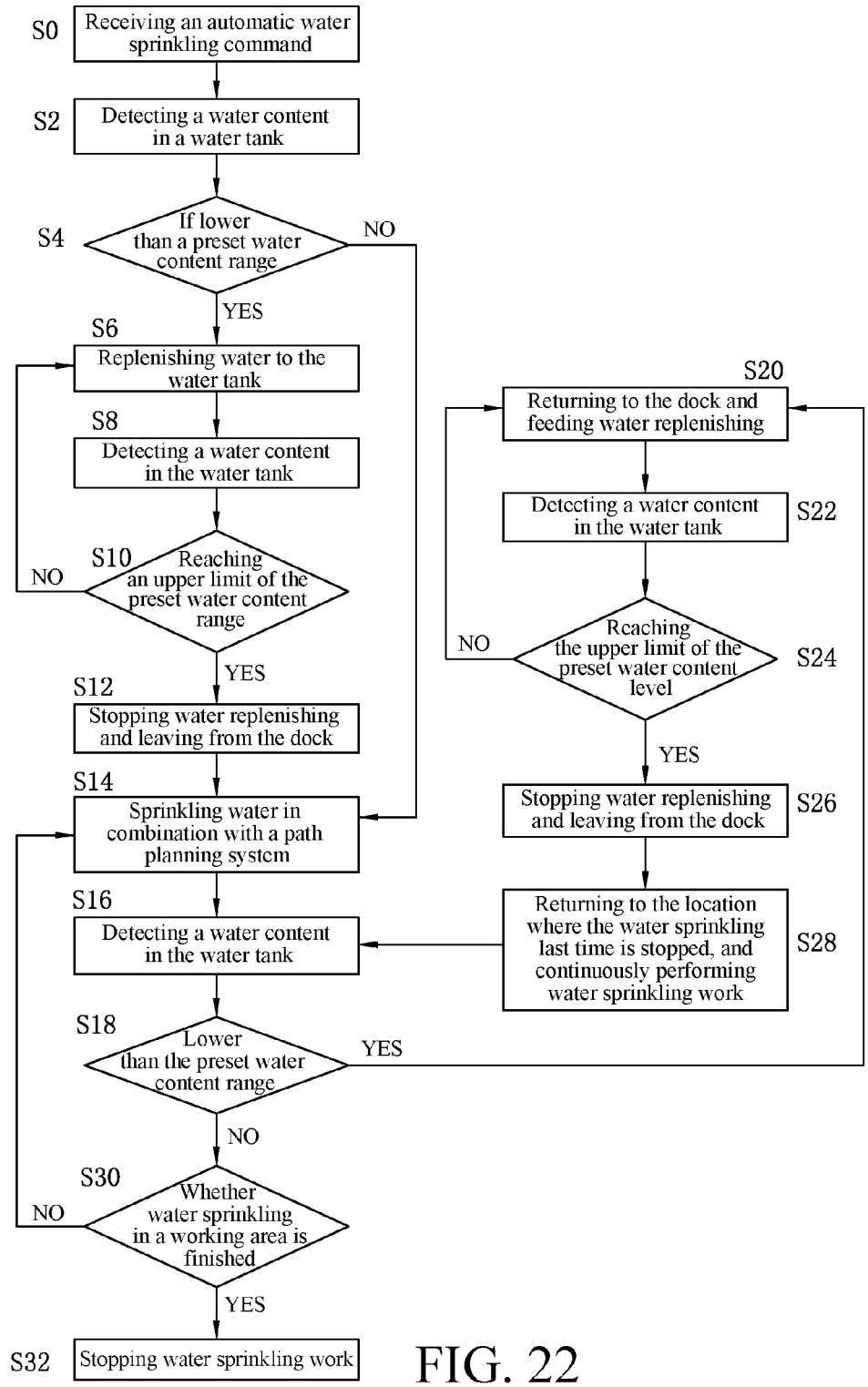
FIG. 22 is a liquid sprinkling flowchart of the autonomous mower in FIG. 20.

How the autonomous mower 210 performs the liquid sprinkling work is introduced in detail in combination with the module diagram of FIG. 3 and the flowchart of FIG. 22.

At first, in step S0, the autonomous mower 210 receives an automatic liquid sprinkling command; step S2 is entered, the liquid level monitoring module 224 detects a liquid level in the liquid box 2161, and meanwhile, converts the detected liquid level information into an electric signal capable of being recognized by the controller 214 to transmit to the controller 214, and the controller 214 judges whether the liquid level in the liquid box is in a preset liquid level range.

In step S4, whether the liquid level in the liquid box is lower than the lower limit of the preset liquid level range is judged, if a judged result is yes, then the controller 214 controls the walking module 220 to be returned to the dock 204 for liquid replenishment, as shown in step S6, specifically, the first pipeline of the liquid sprinkling device 216 is communicated with the liquid supplying pipe 226, the first pipeline 2163 has a switch, the controller 214 turns the switch on, and the liquid in the liquid supplying pipe 226 flows into the liquid box 2161 from the first pipeline 2163. In a liquid replenishing process of the autonomous mower 210, the liquid level monitoring module 224 detects the liquid level in the liquid box 2161 in real time, as shown in step S8, and whether the liquid level in the liquid box 2161 reaches the upper limit of the preset liquid level range is judged. If not, S6 is repeated, and the liquid box is subjected to liquid replenishing continuously; if yes, it is indicated that the liquid box 2161 is full of replenished liquid, step S12 is entered, the controller 214 turns off the switch of the first pipeline 2163, and the autonomous mower 210 stops liquid replenishing and leaves from the dock 204. Then, step S14 is entered, the autonomous mower 210 regularly performs liquid sprinkling work in the working area in combination with the path planning system, specifically, the controller 214 controls the liquid pump 228 such that the liquid in the liquid box 2161 is sprinkled outward from the second pipeline 2165.

In step S4, if the judged result is no, i.e., the liquid in the liquid box is higher than the lower limit of the preset liquid level range, then step S14 is entered.

In step S14, that is, in the liquid sprinkling process of the autonomous mower 210, the liquid level monitoring module 224 monitors a liquid level in the liquid box 2161 in real time, and as shown in step S16, judges whether the liquid level in the liquid box is in the preset liquid level range.

In step S18, that is, whether the liquid level in the liquid box is lower than the lower limit of the preset liquid level range is judged, if the judged result is yes, then step S20 is entered, then controller 214 controls the autonomous mower to be returned to the dock 204 for liquid replenishing, and a specific liquid replenishing process is introduced before, and is not repeated herein. Meanwhile, as shown in step S22, in the liquid replenishing process of the autonomous mower 210, the liquid level monitoring module 224 detects the liquid level in the liquid box 2161 in real time and judges whether the liquid level in the liquid box 2161 has reached the upper limit of the preset liquid level range, as shown in step S24. If not, S20 is repeated to continuously replenish liquid to the liquid box; if yes, it is indicated that the liquid box 2161 is full of the replenished liquid, step S26 is entered, the autonomous mower 210 stops liquid replenishing and leaves from the dock 204. Then step S28 is entered, the autonomous mower 210 is returned to the location where the liquid sprinkling last time is stopped in combination with the path planning system to continuously sprinkle liquid. Then step S16 is entered.

In step S18, if the judged result is no, then step S30 is entered, that is, whether the autonomous mower has finished the liquid sprinkling working of all working area is judged through the path planning system. If the judging result is yes, that is, the autonomous mower has finished all liquid sprinkling work, then step S32 is entered, and the controller 214 controls the autonomous mower 210 to stop liquid sprinkling work; and if the judged result is no, then step S14 is repeated.

The autonomous mower provided by the embodiment of the present invention integrates the automatic liquid sprinkling function in addition to the basic function of automatic mowing, application of the autonomous mower is expanded, and use requirements of the user on many aspects are met.

Those skilled in the art can conceive that the present invention also has other implementing manners as long as the adopted technical essence is same as or similar to that of the present invention, or any change and substitution made based on the present invention are in the protective scope of the present invention.

What is claimed is:

1. A self-moving robot, comprising a shell, a driving module, driving the self-moving robot to move on the ground; a mowing module, executing mowing work; an energy module, providing energy for the self-moving robot; a control module, controlling the self-moving robot to automatically move and execute work, wherein,
the self-moving robot further comprises a cleaning module executing ground cleaning work; the self-moving robot has a mowing mode and a cleaning mode, under the mowing mode, the control module controls the self-moving robot to execute mowing work, and under the cleaning mode, the control module controls the self-moving robot to execute cleaning work, wherein
the self-moving robot further comprises a ground recognizing unit, which collects ground information of a target area and judges the target ground to be a grassland or road surface.

2. The self-moving robot according to claim 1, wherein the control module, according to a recognized result of the ground recognizing unit on the target area, controls the self-moving robot to be kept on the grassland under the mowing mode to execute mowing work and to be kept on the road surface under the cleaning mode to execute cleaning work.

3. The self-moving robot according to claim 1, wherein the control module, according to a recognized result of the ground recognizing unit on the target area, is switched to the cleaning mode from the mowing mode when the self-moving robot moves to the road surface from the grassland; and is switched to the mowing mode from the cleaning mode when the self-moving robot moves to the grassland from the road surface.

4. The self-moving robot according to claim 1, wherein the control module, according to a recognized result of the ground recognizing unit on the target area, controls the self-moving robot to be in the mowing mode when it is on the grassland, and controls the self-moving robot to be in the cleaning mode when it is on the road surface.

5. The self-moving robot according to claim 1, wherein the ground recognizing unit comprises a camera and a recognizing element connected to the camera; the camera captures a ground image of the target area and transmits to the recognizing unit, a ground type judging algorithm is preset in the recognizing element, and the recognizing element extracts image features and transmits to the ground type judging algorithm to judge the target area to be the grassland or road surface.

6. The self-moving robot according to claim 1, wherein the ground recognizing unit comprises a ground hardness sensor and a recognizing element connected to the ground hardness sensor; the ground hardness sensor collects the ground hardness information of the target area and transmits the recognizing element, a ground type judging algorithm is preset in the recognizing element, and the recognizing element inputs the ground hardness information to the ground type judging algorithm to judge the target area to be the grassland or road surface.

7. The self-moving robot according to claim 1, wherein the control module comprises a mode control unit, which controls the self-moving robot to be switched between the mowing mode and the cleaning mode according to a preset program.

8. The self-moving robot according to claim 7, wherein the mode control unit allocates time when the self-moving robot is in the mowing mode and time when the self-moving robot is in the cleaning mode according to date or season information.

9. The self-moving robot according to claim 1, wherein the cleaning module is a leaf cleaning module configured to clean leaves.

10. The self-moving robot according to claim 9, wherein the leaf cleaning module is a blowing module, an air sucking module or sweeping module.

11. The self-moving robot according to claim 1, wherein the cleaning module is detachably mounted on the shell.

* * * * *